(12) United States Patent
Tomita

(10) Patent No.: US 7,593,149 B2
(45) Date of Patent: Sep. 22, 2009

(54) OPTICAL SCANNING UNIT HAVING MORE MAINTENANCE-FRIENDLY ADJUSTABLE LENS HAVING A SUPPORT MEMBER WITH FIRST AND SECOND FACES, AN ADJUSTING MEMBER AND MOVING MEMBER OPPOSITE THE ADJUSTING MEMBER, AND IMAGE FORMING APPARATUS INCLUDING THE SAME

(75) Inventor: Yasumasa Tomita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 125 days.

(21) Appl. No.: 11/651,984

(22) Filed: Jan. 11, 2007

(65) Prior Publication Data

US 2007/0159674 A1    Jul. 12, 2007

(30) Foreign Application Priority Data

Jan. 11, 2006    (JP)    .............................. 2006-003705

(51) Int. Cl.
    *G02B 26/08*    (2006.01)
(52) U.S. Cl. .............. 359/197.1; 359/198.1; 359/221.2; 347/263
(58) Field of Classification Search ...... 359/196–226.3, 359/813, 822–823; 347/137, 138, 263
    See application file for complete search history.

(56) References Cited

U.S. PATENT DOCUMENTS 4,868,673 A    9/1989    Negoro 5,255,115 A    10/1993    Kikuchi (Continued)

FOREIGN PATENT DOCUMENTS

EP    0564730 A1    10/1993

(Continued)

OTHER PUBLICATIONS

European Patent Office Search Report dated Jun. 6, 2007, for corresponding European Patent Application No. 07000495.7-2202.

*Primary Examiner*—Stephone B Allen
*Assistant Examiner*—Jennifer L. Doak
(74) *Attorney, Agent, or Firm*—Harness, Dickey & Pierce, P.L.C.

(57) ABSTRACT

An optical scanning unit includes: a light source configured to emit a light beam; a lens arranged so that the light beam emitted from the light source passes therethrough; a rotatable deflector configured to deflect the light beam coming from the lens, the deflected light beam being guided to a light receiving member; a movable lens holder configured to hold the lens, the lens holder being provided in a space between the light source and the deflector; a support member having a first face located on a first side thereof, the first face facing toward a vertically-downward direction and extending in a direction substantially parallel to a reference-axis defined between the light source and the deflector, there also being a second face located on a second side, the second face being arranged opposite to the first face; and a force-transferring member configured to transfer a force to the lens holder for moving the lens holder along the first face of the support member, the force being applied to the force-transferring member at the second side of the support member.

17 Claims, 13 Drawing Sheets

U.S. PATENT DOCUMENTS

| | | | | |
|---|---|---|---|---|
| 5,257,047 | A * | 10/1993 | Haneda et al. | 347/137 |
| 5,258,873 | A * | 11/1993 | Mishina et al. | 359/654 |
| 5,956,072 | A | 9/1999 | Omura | |
| 6,324,023 | B1 * | 11/2001 | Nagaoka et al. | 359/824 |
| 6,731,419 | B2 * | 5/2004 | Koreeda | 359/210 |
| 2004/0036936 | A1 * | 2/2004 | Nakajima et al. | 359/204 |
| 2005/0111065 | A1 | 5/2005 | Tomita | |
| 2005/0248884 | A1 | 11/2005 | Peterson et al. | |
| 2006/0103906 | A1 * | 5/2006 | Sato et al. | 359/205 |
| 2006/0139440 | A1 | 6/2006 | Tomita | |

FOREIGN PATENT DOCUMENTS

| | | |
|---|---|---|
| EP | 0849930 B1 | 7/2003 |
| JP | 55-009532 | 1/1980 |
| JP | 05-034618 | 2/1993 |
| JP | H05-34618 | 5/1993 |
| JP | H06-54011 | 7/1994 |
| JP | 08-304726 | 11/1996 |
| JP | 2528688 | 12/1996 |
| JP | 09-288245 | 11/1997 |
| JP | 10-215351 | 8/1998 |
| JP | 2000-147399 | 5/2000 |
| JP | 2001-154135 | 6/2001 |
| JP | 2002-221682 | 8/2002 |
| JP | 2004-074627 | 3/2004 |
| JP | 2004-246032 | 9/2004 |

* cited by examiner

OPTICAL SCANNING UNIT HAVING MORE MAINTENANCE-FRIENDLY ADJUSTABLE LENS HAVING A SUPPORT MEMBER WITH FIRST AND SECOND FACES, AN ADJUSTING MEMBER AND MOVING MEMBER OPPOSITE THE ADJUSTING MEMBER, AND IMAGE FORMING APPARATUS INCLUDING THE SAME

PRIORITY STATEMENT

This application claims foreign priority under 35 U.S.C. §119 upon Japanese patent application No. 2006-003705 filed on Jan. 11, 2006 to Japanese Patent Office, the entire contents and disclosure of which is hereby incorporated herein reference.

BACKGROUND

In general, an image forming apparatus includes an optical scanning unit. In the optical scanning unit, a light beam emitted by a light source may enter a rotatable deflector via a lens. Then, the light beam deflected by the rotatable deflector may be guided to an image-carrying member such as photoconductor to scan a surface of the image-carrying member to form a latent image on the image-carrying member.

For example, such optical writing unit may include a light source, a collimate lens, a cylindrical lens, a polygon mirror (as rotatable deflector), and other mirrors to guide a light beam from the light source to the image-carrying member.

In such optical writing unit, if a reflection face of the polygon mirror may be slanted from an optimal angle (i.e., mirror face has a tangle error), or if an axis of the polygon mirror may be slanted from an optimal angle due to assembly error, light beams may scan the image-carrying member with an uneven pitch relative to each other, or light beams may not be focused on a optimal position on the image-carrying member.

If such phenomenon may occur, a resultant image to be produced on a recording medium may have a lower image quality.

The cylindrical lens may be provided in the optical writing unit to reduce the above-mentioned drawbacks. In general, the cylindrical lens may be disposed between the light source and polygon mirror used as rotatable deflector.

A light reference-axis of the cylindrical lens may be defined between a light emitting point of the light source and a given reflection point of the polygon mirror used as rotatable deflector.

A related art image forming apparatus may include an optical writing unit having a moving unit for moving a cylindrical lens to adjust a reference-axis direction of cylindrical lens.

In such related art, the cylindrical lens may be moved by a driver (e.g. motor) to adjust a reference-axis direction of the cylindrical lens.

Accordingly, such related art may need a driver, driving-force transmission mechanism, and a driving mechanism controller, for example, by which such related art may have a complex configuration and need a space for allocating such devices. Such a configuration may not be favorable from a viewpoint of miniaturization of image forming apparatus.

Another related art image forming apparatus may include an optical writing unit having another configuration for moving a cylindrical lens in its reference-axis direction.

Such optical writing unit may include a lens holder, which holds the cylindrical lens, and a housing having a support face on which the lens holder is placed.

The lens holder may be movable on the support face in a direction parallel to a reference-axis direction of the cylindrical lens.

The support face may include a guide member thereon to guide a movement of the lens holder in the reference-axis direction of the cylindrical lens.

The lens holder may have an adjustment hole, which has a substantially rectangular shape formed along the support face and parallel to the reference-axis direction.

A screw may be inserted through the adjustment hole and then may be engaged with a screw hole provided on the housing used as support member.

In such optical writing unit, the screw may be loosened when adjusting a position of the cylindrical lens.

Specifically, under such screw-loosened condition, the lens holder may be moved in the reference-axis direction by a force applied from a hand of maintenance person to adjust a position of the lens holder.

After adjusting a position of the lens holder at an appropriate position, the screw may be tightened to fix the cylindrical lens at such appropriate position.

Such optical writing unit may not need a driver, driving-force transmission mechanism, and a driving mechanism controller to adjust a position of the cylindrical lens, by which such another related art may not need a complex configuration and a space for allocating such devices.

Another background art image forming apparatus may include another optical writing unit having another configuration for moving a cylindrical lens in its reference-axis direction.

Such optical writing unit may include a lens holder for holding a cylindrical lens, and a housing (used as support member) having a support face having a guide hole.

The guide hole may have a substantially rectangular shape formed along the support face and parallel to the reference-axis direction.

The lens holder has a protruded portion to be snap-fitted to the guide hole, and the lens holder may be moveable on the support face in the reference-axis direction of the cylindrical lens when the protruded portion of lens holder moves in the guide hole.

Furthermore, the housing may have a long-shaped hole aligned in the reference-axis direction of the cylindrical lens.

When the lens holder is placed on the housing, a projection portion of the lens holder may be exposed to an outside of the housing. In other words, the projection of the lens holder may pass though the long-shaped hole, and an exposed portion of the lens holder may be used to move the lens holder in the reference-axis direction of the cylindrical lens.

Specifically, a maintenance person may grab the exposed portion of the lens holder and move the lens holder along the long-shaped hole by applying a hand force, by which a position of the cylindrical lens may be adjusted.

Such optical writing unit may further include another configuration having an eccentric cam for moving the cylindrical lens in the reference-axis direction with a hand force of maintenance person.

In this art, the lens holder may have a long-shaped hole formed in a direction perpendicular to a reference-axis direction.

The eccentric cam may include a circular base, a center-axis shaft, and an eccentric-axis shaft, for example.

The center-axis shaft may extend in a first direction from the circular base and may be aligned on a rotational axis of the circular base.

The eccentric-axis shaft may extend in a second direction from the circular base deviated from a rotational axis of the circular base. The first direction and second direction may be set to an opposite direction each other, for example.

The center-axis shaft of eccentric cam may be inserted in a bearing hole of the housing and some part of the center-axis shaft may be exposed to an outside of the housing.

The eccentric-axis shaft of eccentric cam may be inserted in the long-shaped hole of the lens holder.

A maintenance person can grab an exposed portion of the center-axis shaft to rotate the eccentric cam with a hand force.

With such configuration, the lens holder may be moved in its reference-axis direction while the protruded portion of the lens holder may be guided in the guide hole of the housing.

Accordingly, a maintenance person may adjust a position of the cylindrical lens in its reference-axis direction with a hand force.

Such optical writing unit may not need a driver, driving-force transmission mechanism, and a driving mechanism controller to adjust a position of the cylindrical lens, by which such background art may not need a complex configuration and a space for allocating such devices.

However, the above-mentioned optical writing unit may have a lower working efficiency when adjusting a position of the cylindrical lens by a maintenance person. Hereinafter, such drawback may be explained.

In general, when adjusting a position of the cylindrical lens in its reference-axis direction, an optical writing unit may be placed on a platform of an adjustment machine, wherein a posture or orientation of the optical writing unit on the platform may be set substantially similar to a posture or orientation of the optical writing unit in an image forming apparatus.

Then, a light-receiving device such as CCD (charge coupled device) may be placed on a given position of the adjustment machine, wherein the given position may correspond to a position of a surface of image-carrying member (or photoconductor) when the optical writing unit is placed in the image forming apparatus. A number of light-receiving devices may be set to one or two, for example.

Then, the optical writing unit is activated, and the light-receiving device may detect a light beam scanning the image-carrying member in an axis direction of the image-carrying member.

Then, such detected result may be displayed on a display unit as lens-position-adjustment information. A maintenance person may check or look up such information to adjust a position of the cylindrical lens.

In such optical writing unit, when a maintenance person grabs the lens holder by hand to move the lens holder, the hand of maintenance person may block a path of incident light or outgoing light of the cylindrical lens.

In such configuration, the maintenance person may adjust a position of the cylindrical lens as below.

At first, the maintenance person may move the lens holder with a hand. Then, the hand is set aside from the optical writing unit so that the light-receiving device can detect a light beam.

Then, by checking or looking up lens-position-adjustment information prepared from a detection result detected by the light-receiving device, the maintenance person may move the lens holder by hand again to adjust a position of the cylindrical lens.

The maintenance person may repeat the above-mentioned processes to find an appropriate position of the cylindrical lens.

Such process may not be convenient for the maintenance person because the maintenance person may have to stop a movement of the lens holder to check or look up the lens-position-adjustment information and then restart a movement of the lens holder.

Accordingly, the maintenance person may feel an inconvenience for conducting such above-mentioned processes.

In case of background art image forming apparatus, a maintenance person can move the lens holder by grabbing the exposed portion of center-axis shaft by hand, which may be exposed to an outside of the housing.

Accordingly, a hand of maintenance person may not block an incident light or outgoing light of the cylindrical lens when adjusting a position of cylindrical lens.

Under such configuration, the maintenance person may adjust a position of the cylindrical lens as below.

The maintenance person may move the lens holder with a hand while checking or looking up lens-position-adjustment information prepared from a detection result detected by the light-receiving device to find an appropriate position of the cylindrical lens.

Accordingly, in the background art image forming apparatus, the maintenance person may adjust a position of the cylindrical lens in the optical writing unit easier compared to the above-mentioned optical writing unit in the related art image forming apparatus.

However, the optical writing unit in the background art image forming apparatus may be disposed under an image-carrying member (or photoconductor) when the optical writing unit is installed in the image forming apparatus, wherein the optical writing unit emits a light beam (or scanning light beam) in an upward direction.

Accordingly, such optical writing unit may be placed on a platform of an adjustment machine with a posture or orientation, which may be substantially similar to a posture or orientation of the optical writing unit, which is installed in the image forming apparatus.

Therefore, when the optical writing unit is placed on the platform of the adjustment machine, the exposed portion of the center-axis shaft, exposed to an outside of the housing, may face a downside in a vertical direction.

Under such configuration, the maintenance person may have to put a hand from a downside of the platform when adjusting a position of the cylindrical lens.

Accordingly, the maintenance person may have to move the exposed portion of the center-axis shaft from downside of the optical writing unit, placed on the platform of the adjustment machine.

The maintenance person may feel uncomfortable for such adjustment work compared to an adjustment work conducted from an upper side of the optical writing unit placed on the platform of the adjustment machine. Such uncomfortable situation may be undesirable from a viewpoint of a positioning the cylindrical lens with a higher precision.

Positioning of cylindrical lens in its reference-axis direction may need a higher precision to enhance or maintain an image quality to be produced by an image forming apparatus.

Therefore, it has been desired that a maintenance person can conduct such adjustment work in a precise manner by a hand with a simplified manner.

SUMMARY

An embodiment of the present invention provides an optical scanning unit comprising: a light source configured to emit a light beam; a lens arranged so that the light beam emitted from the light source passes therethrough; a rotatable deflector configured to deflect the light beam coming from the lens, the deflected light beam being guided to a light receiving member; a movable lens holder configured to hold the lens, the lens holder being provided in a space between the light source and the deflector; a support member having a first face located on a first side thereof, the first face facing toward a vertically-downward direction and extending in a direction substantially parallel to a reference-axis defined between the light source and the deflector, there also being a second face located on a second side, the second face being arranged opposite to the first face; and a force-transferring member configured to transfer a force to the lens holder for moving the lens holder along the first face of the support member, the force being applied to the force-transferring member at the second side of the support member.

An embodiment of the present invention provides an image forming apparatus comprising: an image-carrying member; an optical scanning unit, such as is mentioned above, configured to form a latent image on the image-carrying member via irradiating a light beam on the image-carrying member; and a developing unit configured to develop the latent image and to transfer the developed image to a recording medium.

An embodiment of the present invention provides a method of adjusting a position of a lens in an optical scanning unit such as is mentioned above. Such a method comprises: emitting a light beam towards the lens, the light beam to be guided by the lens to a sensor placed at a given position; sensing an optical property of the light beam with the sensor; outputting information for adjusting a position of the lens in the optical scanning unit based on a result of the sensing step; applying, at the second side of the support member, a force to the force-transferring member such that the lens holder is moved along the first face of the support member; and maintaining, while the lens holder is being moved, contact between the lens and the first face of the support member.

Additional features and advantages of the present invention will be more fully apparent from the following detailed description of example embodiments, the accompanying drawings and the associated claims.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
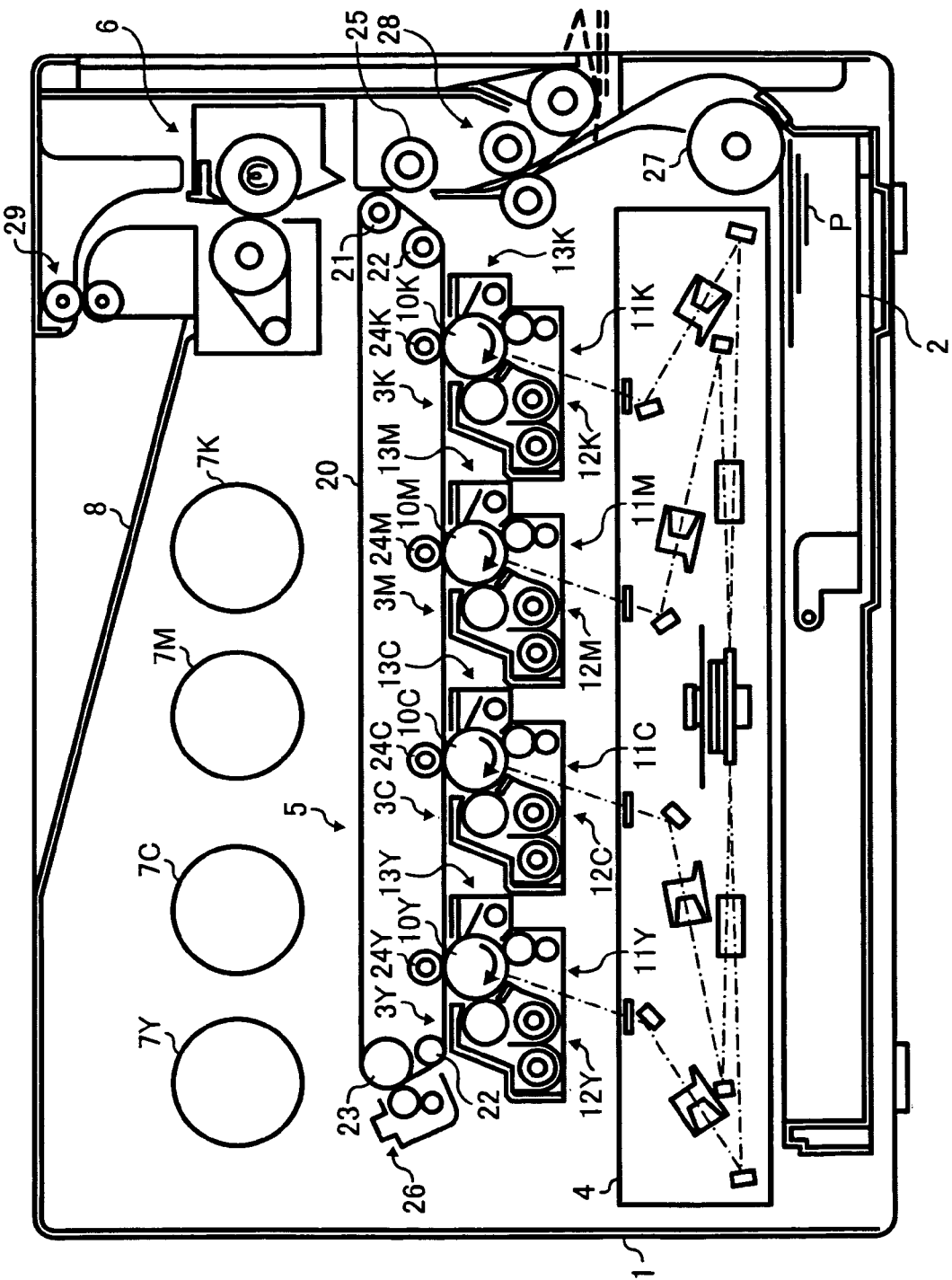
FIG. 1 is a schematic configuration of an image forming apparatus having an optical scanning unit according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

It will be understood that if an element or layer is referred to as being "on," "against," "connected to" or "coupled to" another element or layer, then it can be directly on, against connected or coupled to the other element or layer, or intervening elements or layers may be present. In contrast, if an element is referred to as being "directly on", "directly connected to" or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to the drawings, wherein like reference numerals designate identical or corresponding parts throughout the several views, an image forming apparatus according to an example embodiment is described with particular reference to FIG. 1.

FIG. 1 is a schematic cross-sectional view of an image forming apparatus 1 according to an example embodiment. The image forming apparatus 1 may include a printer having a tandem arrangement and intermediate transfer method, but the image forming apparatus 1 may not be limited to such printer but may include other applications.

As show in FIG. 1, the image forming apparatus 1 may include a sheet cassette 2, image forming units 3Y, 3C, 3M, and 3K, an optical writing unit 4, an intermediate transfer unit 5, and a fixing unit 6, for example.

The sheet cassette 2 may be withdrawable from the image forming apparatus 1.

The image forming units 3Y, 3C, 3M, and 3K may be used to form toner images of yellow(Y), cyan(C), magenta(M), and black(K), respectively. Hereinafter, reference characters of Y, C, M, and K may represent yellow, cyan, magenta, and black, respectively.

Figure 2:
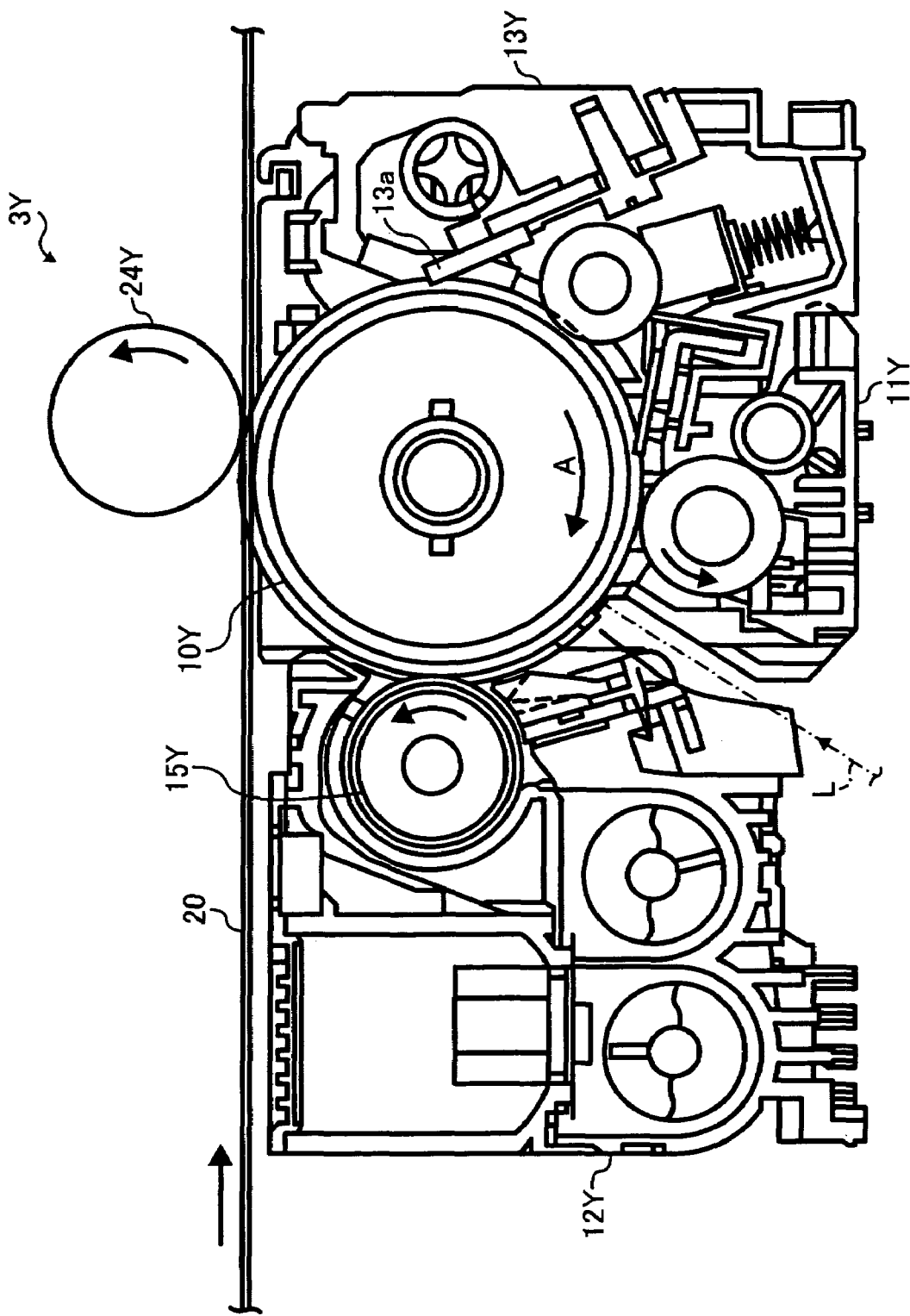
FIG. 2 is a schematic configuration of an image forming unit (according to an example embodiment of the present invention) in an image forming apparatus in FIG. 1.

FIG. 2 is a schematic cross-sectional view of the image forming unit 3Y. The image forming units 3Y, 3C, 3M, and 3K may take a similar configuration one another except toner colors.

As shown in FIGS. 1 and 2, the image forming units 3Y, 3C, 3M, and 3K may include photoconductors 10Y, 10C, 10M, and 10K, respectively.

The image forming units 3Y, 3C, 3M, and 3K may further include charge units 11Y, 11C, 11M, and 11K, developing units 12Y, 12C, 12M, and 12K, and cleaning units 13Y, 13C, 13M, and 13K around the photoconductors 10Y, 10C, 10M, and 10K, respectively.

The photoconductors 10Y, 10C, 10M, and 10K having a drum shape may rotate in a direction shown by an arrow A in FIG. 2. The photoconductors 10Y, 10C, 10M, and 10K may be used as an image carrier, which forms a latent image and a toner image thereon.

For example, each of the photoconductors 10Y, 10C, 10M, and 10K may be made of a cylinder, made of aluminum having a given diameter (e.g., 40 mm), and a photosensitive layer formed on the cylinder. The photosensitive layer may include an organic photo conductor (OPC), for example.

The charge units 11Y, 11C, 11M, and 11K may charge surfaces of the photoconductors 10Y, 10C, 10M, and 10K, respectively.

The developing units 12Y, 12C, 12M, and 12K may respectively develop latent images formed on the photoconductors 10Y, 10C, 10M, and 10K as toner image.

The cleaning units 13Y, 13C, 13M, and 13K may remove toners remaining on the photoconductors 10Y, 10C, 10M, and 10K, respectively.

The optical writing unit 4, provided under the image forming units 3Y, 3C, 3M, and 3K, may emit a light beam L to the surface of the photoconductors 10Y, 10C, 10M, and 10K. The optical writing unit 4 may be used as optical scanning unit.

The intermediate transfer unit 5, provided over the image forming units 3Y, 3C, 3M, and 3K, may include an intermediate transfer belt 20, to which toner images are transferred from the image forming units 3Y, 3C, 3M, and 3K.

The fixing unit 6 may fix the toner images on a transfer sheet P, which receives the toner images from the intermediate transfer belt 20.

The image forming apparatus 1 may further include toner bottles 7Y, 7C, 7M, and 7K over the intermediate transfer unit 5 as shown in FIG. 1. The toner bottles 7Y, 7C, 7M, and 7K can store toners of yellow(Y), cyan(C), magenta(M), and black(K), respectively. The toner bottles 7Y, 7C, 7M, and 7K may be removable from the image forming apparatus 1 by opening an ejection tray 8 of the image forming apparatus 1.

The optical writing unit 4 may include a light source (e.g., laser diode) and a polygon mirror, for example.

The light source may emit the laser beam L, and the polygon mirror deflects the laser beam L. Then, the deflected laser beam L may scan surfaces of the photoconductors 10Y, 10C, 10M, and 10K. The optical writing unit 4 will be explained in detail later.

In the intermediate transfer unit 5, the intermediate transfer belt 20 may be extended by a drive roller 21, a tension roller 22, and a driven roller 23, and may be rotated in a counter-clockwise direction in FIG. 1 at a given timing.

As shown in FIG. 1, the intermediate transfer unit 5 may include primary transfer rollers 24Y, 24C, 24M, and 24K used for transferring toner images from the photoconductors 10Y, 10C, 10M, and 10K to the intermediate transfer belt 20.

As shown in FIG. 1, the intermediate transfer unit 5 may further include a secondary transfer roller 25, which may transfer the toner images from the intermediate transfer belt 20 to the transfer sheet P.

The intermediate transfer unit 5 may further include a belt-cleaning unit 26, which may remove toners remaining on the intermediate transfer belt 20 after the toner images are transferred from the intermediate transfer belt 20 to the transfer sheet P.

Hereinafter, an image forming process in the image forming apparatus 1 is explained.

At first, the charge units 11Y, 11C, 11M, and 11K may uniformly charge the surfaces of the photoconductors 10Y, 10C, 10M, and 10K, respectively.

Then, the optical writing unit 4 may scan the surfaces of the photoconductors 10Y, 10C, 10M, and 10K with the laser beam L, based on original image information, to form latent images on the surfaces of the photoconductors 10Y, 10C, 10M, and 10K.

The latent images formed on the surfaces of the photoconductors 10Y, 10C, 10M, and 10K may be developed as toner image by supplying toners from developing rollers 15Y, 15C, 15M, and 15K in the developing units 12Y, 12C, 12M, and 12K to the surface of the photoconductors 10Y, 10C, 10M, and 10K, respectively.

The toner images formed on the photoconductors 10Y, 10C, 10M, and 10K may be superimposingly transferred to the intermediate transfer belt 20, rotating in a counter-clockwise direction in FIG. 1, with an effect of the primary transfer rollers 24Y, 24C, 24M, and 24K.

The primary transfer rollers 24Y, 24C, 24M, and 24K may conduct such primary transfer operation with a given timing each other so that toner images of each color can be correctly superimposed on the intermediate transfer belt 20.

After such primary transfer operation, each surface of the photoconductors 10Y, 10C, 10M, and 10K may be cleaned by a cleaning blade 13a of the cleaning units 13Y, 13C, 13M, and 13K, by which the photoconductors 10Y, 10C, 10M, and 10K may be prepared for a next image forming operation.

Toners stored in toner bottles 7Y, 7C, 7M, and 7K may be supplied to the developing units 12Y, 12C, 12M, and 12K in the image forming units 3Y, 3C, 3M, and 3K through a toner transport route (not shown), as required.

The transfer sheet P in the sheet cassette 2 may be fed to paired-registration rollers 28 in the image forming apparatus 1 by a feed roller 27, provided near the sheet cassette 2.

The paired-registration rollers 28 may feed the transfer sheet P to the second transfer roller 25 at a given timing so that the toner images can be transferred from the intermediate transfer belt 20 to the transfer sheet P.

Then, the transfer sheet P may be transported to the fixing unit 6 to fix toner images on the transfer sheet P, and then the transfer sheet P may be ejected to the ejection tray 8 by an ejection roller 29.

After the toner images are transferred from the intermediate transfer belt 20 to the transfer sheet P, the belt-cleaning unit 26 may remove toners remaining on the intermediate transfer belt 20.

Hereinafter, the optical writing unit 4 is explained in detail.

Figure 3:
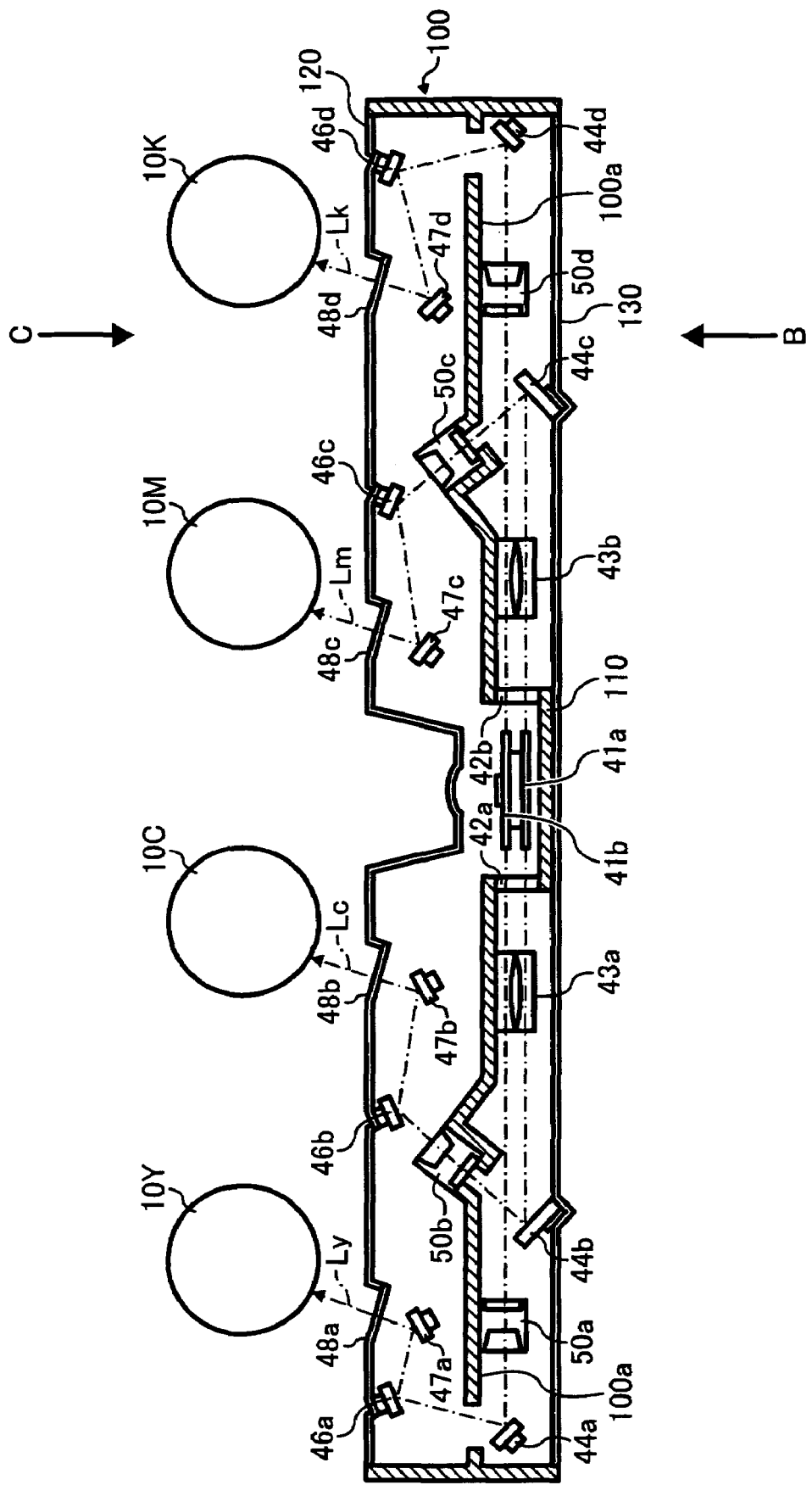
FIG. 3 is a schematic configuration of an optical scanning unit (according to an example embodiment of the present invention) when viewed from an axis direction of a photoconductor.
Figure 4:
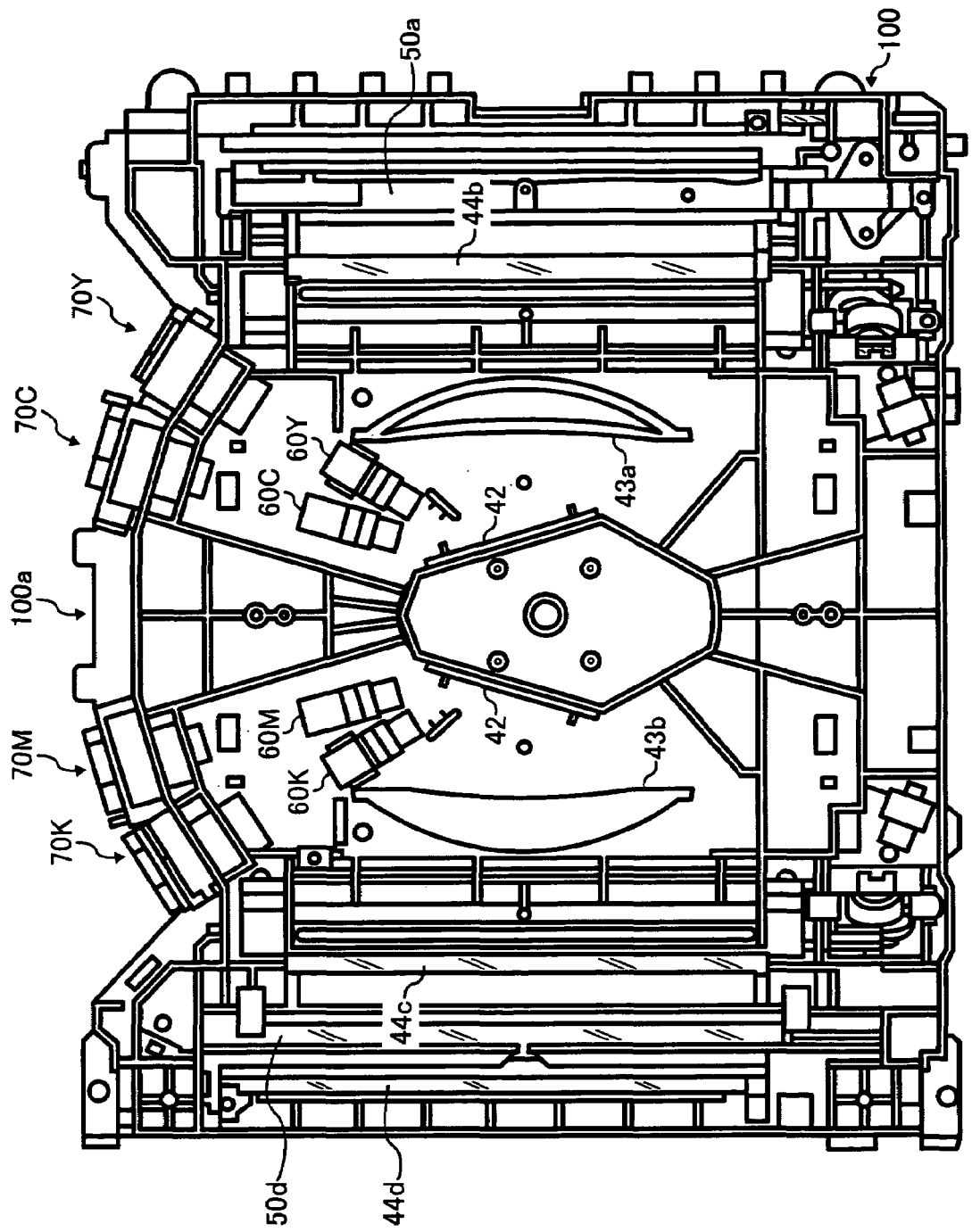
FIG. 4 is a schematic view of lower side of an optical scanning unit in FIG. 3.
Figure 5:
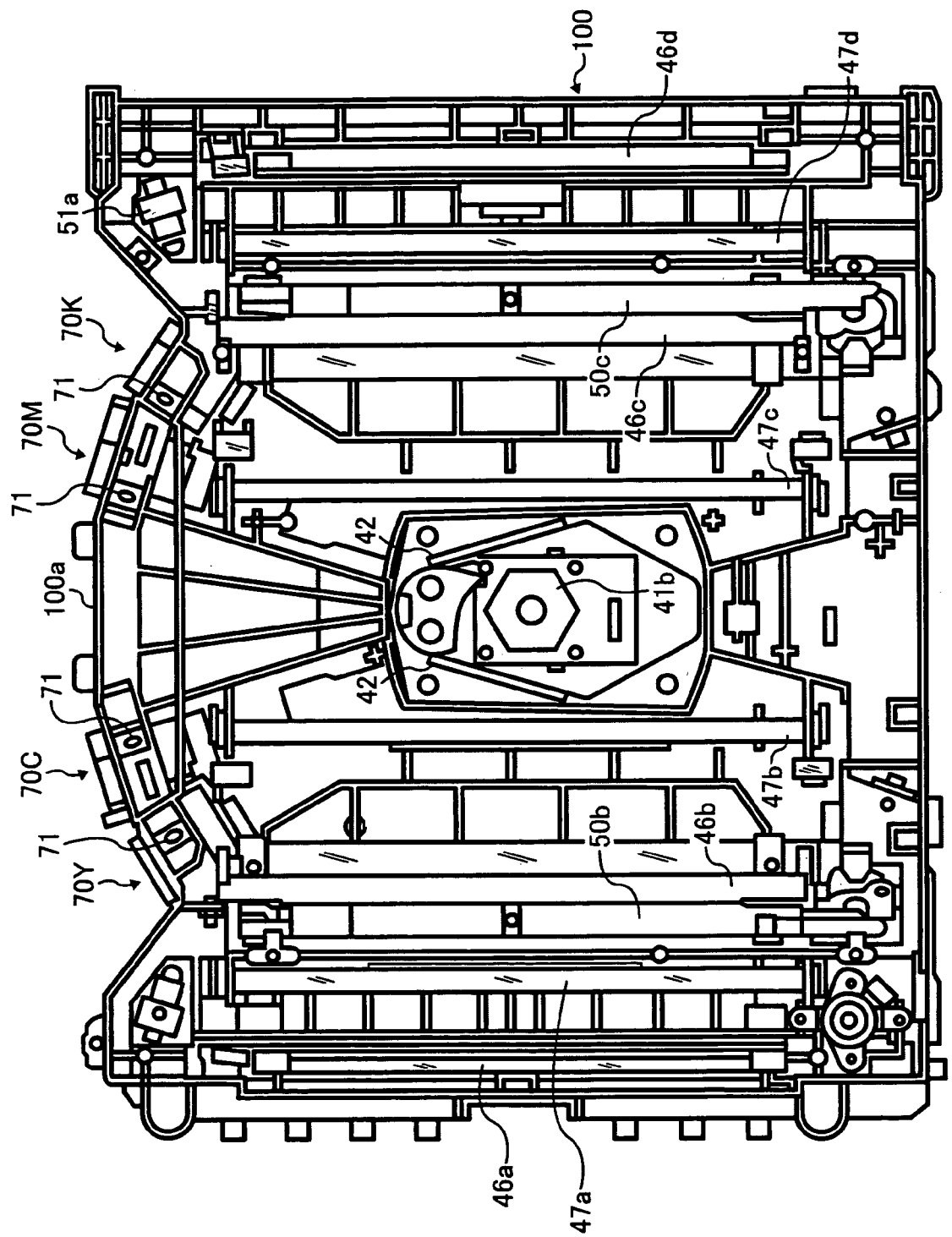
FIG. 5 is a schematic view of upper side of an optical scanning unit in FIG. 3.

FIG. 3 is a schematic configuration of the optical scanning unit 4 when viewed from an axis direction of photoconductor 10. FIG. 4 is a schematic view of lower side of the optical scanning unit 4, viewed from a direction of arrow B in FIG. 3. FIG. 5 is a schematic view of upper side of the optical writing unit 4, viewed from a direction of arrow C in FIG. 3.

In an example embodiment, the optical writing unit 4 may include light source units 70K, 70M, 70C, 70Y as shown in FIGS. 4 and 5.

Each of the light source units 70K, 70M, 70C, 70Y may include a light source, which can emit writing beams Lk, Lm, Lc, and Ly. Each of the writing beams Lk, Lm, Lc, and Ly may scan the photoconductors 10K, 10M, 10C, and 10Y, respectively.

As shown in FIG. 3, the optical writing unit 4 may include polygon mirrors 41a and 41b, which have a regular polygonal shape such as hexagonal shape when viewed from an axis direction of polygon mirror.

Each of the polygon mirrors 41a and 41b may have a plurality of side faces used as reflecting mirror, and may be rotated at a higher speed by a polygon motor (not shown) such as 32,000 rpm (revolution per minute), for example.

The optical writing unit 4 may further include lens units 60Y, 60C, 60M, and 60K having a cylindrical lens as shown in FIG. 4.

As shown in FIG. 4, the lens units 60Y, 60C, 60M, and 60K may be disposed between the light source unit 70K, 70M, 70C, 70Y and polygon mirrors 41a and 41b. A configuration of the lens units 60Y, 60C, 60M, and 60K will be explained later in detail.

As shown in FIGS. 3, 4, and 5, the optical writing unit 4 may include heat insulating glasses 42a and 42b. The heat insulating glasses 42a and 42b may be a transparent member, which can insulate heat generated by the polygon motor.

The optical writing unit 4 may further include f-theta lens 43a, 43b, first mirrors 44a, 44b, 44c, 44d, second mirrors 46a, 46b, 46c, 46d, third mirrors 47a, 47b, 47c, 47d, and long-shaped lens 50a, 50b, 50c, 50d as shown in FIG. 3.

The f-theta lens 43a and 43b may convert a light beam deflected by the polygon mirrors 41a and 41b having equiangular motion to a light beam having uniform linear motion.

The first mirrors 44a, 44b, 44c, 44d, second mirrors 46a, 46b, 46c, 46d, third mirrors 47a, 47b, 47c, 47d, and long-shaped lens 50a, 50b, 50c, 50d may be used to guide a writing beam (or scanning light beam) to each of the photoconductors 10Y, 10C, 10M, and 10K.

The optical writing unit 4 may further include dust-proof glasses 48a, 48b, 48c, and 48d. The dust-proof glasses 48a, 48b, 48C, and 48d may reduce or suppress an intrusion of dust such as toner particles into a housing of the optical writing unit 4.

As shown in FIGS. 3 to 5, the optical writing unit 4 may include a housing 100 for containing the above-mentioned parts.

Specifically, as shown in FIG. 4, the light source units 70K, 70M, 70C, and 70Y may be attached to a lower side of a support plate 100a of the housing 100.

Furthermore, the lower side of the support plate 100a may be attached with the lens units 60Y, 60C, 60M, and 60K having a cylindrical lens 61, f-theta lenses 43a, 43b, and first mirrors 44a, 44b, 44c, and 44d.

Furthermore, the lower side of the support plate 100a may be attached with the long-shaped lens 50a for Y color and long-shaped lens 50d for K color.

On one hand, an upper side of the support plate 100a may be attached with a long-shaped lens 50c for M color and a long-shaped lens 50b for C color.

The long-shaped lens 50a, 50b, and 50c may have a holder, with which the long-shaped lens 50a, 50b, and 50c may be attached on the housing 100. The long-shaped lens 50a, 50b, and 50c may be tilted for some degree so that an outgoing angle of laser beam from the long-shaped lens 50a, 50b, and 50c may be adjustable.

The long-shaped lens 50a for K color may be fixed on the upper side face of the support plate 100a directly.

With such configuration, in an example embodiment, an outgoing angle of writing beam (or scanning light beam) from the long-shaped lens 50a, 50b, and 50c may be adjusted by referring the writing beam (or scanning light beam) for K color as a reference beam.

Furthermore, the second mirrors 46a, 46b, 46c, 46d and third mirrors 47a, 47b, 47c, 47d may be attached to the housing 100, which may be over the upper side of the support plate 100a as shown in FIG. 3.

Furthermore, as shown in FIG. 3, the support plate 100a may include a dented portion to install the polygon mirrors 41a and 41b. The dented portion may be referred as container 110, hereinafter.

As shown in FIG. 4, the container 110 may have the heat insulating glass 42 on side walls of the container 110, wherein the heat insulating glass 42 may be disposed between the polygon mirrors 41a, 41b and the lens units 60Y, 60C, 60M, 60K.

The polygon mirrors 41a and 41b may be attached to the container 110 with a screw, for example.

As shown in FIG. 3, the housing 100 may include an upper cover 120 and a lower cover 130.

The upper cover 120 may be attached on an upper side of the housing 100, and the lower cover 130 may be attached on a lower side of the housing 100.

As shown in FIG. 3, the upper cover 120 may be provided with openings to pass through the writing beam Ly, Lc, Lm, and Lk to the photoconductors 10Y, 10C, 10M, and 10K, respectively. The openings may be covered with the dustproof glasses 48a, 48b, 48c, and 48d.

The housing 100, covered by the upper cover 120 and lower cover 130, may reduce an intrusion of dust into the optical writing unit 4, by which optical parts in the optical writing unit 4 such as lens and mirror may be less likely to be contaminated by dust such as toner particles.

The upper cover 120 and lower cover 130 may be made of resinous material, sheet metal, or the like, for example.

The optical writing unit 4 may have the light source units 70Y, 70C, 70M, and 70K, which emit the respective writing beams Ly, Lc, Lm, and Lk based on a signal generated from an original image data.

Such original image data may be input to the image forming apparatus 1 from a scanner (not shown), personal computer or the like, for example.

Then, the writing beams Ly, Lc, Lm, and Lk may pass through a collimate lens (not shown) and an aperture (not shown) provided on a wall of the housing 100.

After passing through the aperture, the writing beams Ly, Lc, Lm, and Lk may pass through the cylindrical lens 61 of the lens units 60Y, 60C, 60M, and 60K, and then may pass through the heat insulating glass 42, and may enter a reflection face of the polygon mirrors 41a and 41b.

The writing beams Ly, Lc, Lm, and Lk may be deflected by the polygon mirrors 41a and 41b, rotated by the polygon motor. Such writing beams Ly, Lc, Lm, and Lk may be used as scanning light beam for scanning each of the photoconductors 10Y, 10C, 10M, and 10K.

Then, the writing beams (or scanning light beams) Ly, Lc, Lm, and Lk may pass through the f-theta lenses 43a and 43b.

The writing beams Lk for K color may pass through the long-shaped lens 50d, and then may reflect on the first lens 44d, second lens 46d, third lens 47d, and then may pass through the dustproof glass 48d. Then, the writing beams Lk may scan the photoconductor 10K to form a latent image for K color on the photoconductor 10K.

In a similar way, the writing beams Ly for Y color may pass through the long-shaped lens 50a, and then may reflect on the first lens 44a, second lens 46a, third lens 47a, and then may pass through the dustproof glass 48a. Then, the writing beams Ly may scan the photoconductor 10Y to form a latent image for Y color on the photoconductor 10Y.

The writing beam Lm for M color may pass through the long-shaped lens 50c via the first lens 44c, and then may reflect on the second lens 46c, third lens 47c, and may pass through the dustproof glass 48c. Then, the writing beams Lm may scan the photoconductor 10M to form a latent image for M color on the photoconductor 10M.

In a similar way, the writing beam Lc for C color may pass through the long-shaped lens 50b via the first lens 44b, and then may reflect on the second lens 46b, third lens 47b, and may pass through the dustproof glass 48b. Then, the writing beams Lc may scan the photoconductor 10C to form a latent image for C color on the photoconductor 10C.

Hereinafter, an adjustment work for adjusting position of cylindrical lens 61 along a direction substantially parallel to a reference-axis is explained.

Figure 6:
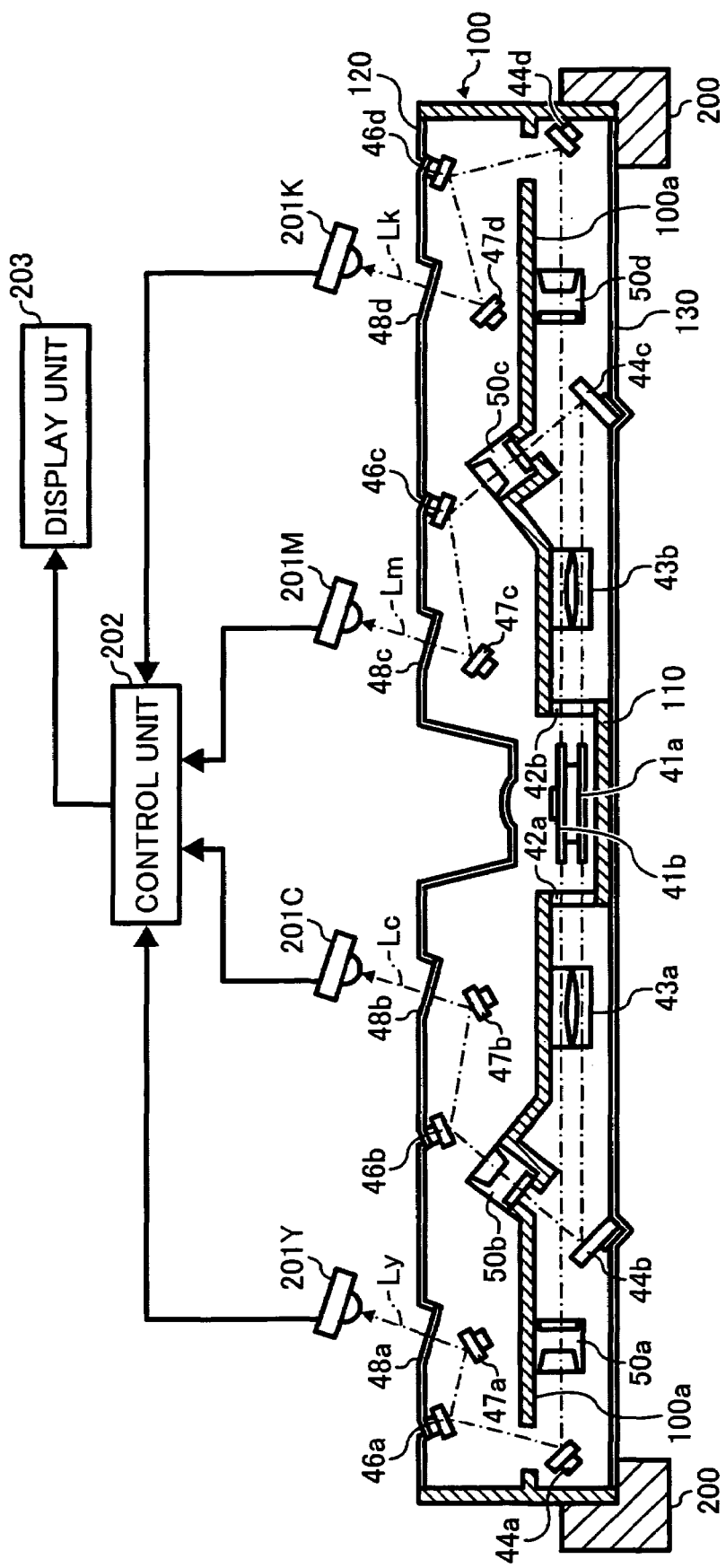
FIG. 6 is a schematic configuration (according to an example embodiment of the present invention) of an optical scanning unit when viewed from an axis direction of photoconductor, in which an optical scanning unit is placed on a platform of an adjustment machine.

FIG. 6 is a schematic configuration of the optical scanning unit 4 (including housing 100, etc.) when viewed from an axis direction of photoconductor 10, in which the optical scanning unit 4 is placed on the platform 200 of an adjustment machine (not shown).

In an example embodiment, the optical writing unit 4 may be placed on the platform 200 with a posture or orientation, which is substantially similar to a posture or orientation of the optical writing unit 4 installed in the image forming apparatus 1 (see FIGS. 1 and 3).

After placing the optical writing unit 4 on the platform 200 with such posture or orientation, light detectors 201Y, 201C, 201M, and 201K may be disposed over the optical writing unit 4 at a given position, respectively, as shown in FIG. 6.

Specifically, the light detectors 201Y, 201C, 201M, and 201K may be disposed at a given position, which corresponds to a position for each surface of the photoconductors 10Y, 10C, 10M, and 10K when the optical writing unit 4 is installed in the image forming apparatus 1.

In other words, instead of the photoconductors 10Y, 10C, 10M, and 10K, the light detectors 201Y, 201C, 201M, and 201K may be disposed in a configuration shown in FIG. 6, respectively, which may be understood by comparing configurations shown in FIGS. 3 and 6.

The light detectors 201Y, 201C, 201M, and 201K may include a CCD (charge-coupled device), for example.

Specifically, as one example, three detectors may be used for light detector 201Y: one detector may be disposed at an each end portion of the axis direction of photoconductor 10Y, and one detector may be disposed at a center portion of the axis direction of photoconductor 10Y. Although the photoconductor 10Y may not exist in a configuration in FIG. 6, the phrase of "axis direction of photoconductor 10Y" may be used for the clarity of explaining of the positions of the light detector 201Y.

As similar to the light detector 201Y, e.g., three detectors may be used for each of light detectors 201C, 201M, and 201K with a similar configuration. However, a number of light detectors and position of light detectors may be changed, as required.

As shown in FIG. 6, the light detectors 201Y, 201C, 201M, and 201K may be connected to a control unit 202 of the adjustment machine.

The light detectors 201Y, 201C, 201M, and 201K may detect respective light beams coming form the optical writing unit 4, and may transmit detection results such as received light-intensity and beam-spot diameter to the control unit 202 as detection signal.

The control unit 202 may conduct a plurality of computations based on received detection signal and may continuously display information, corresponding to the detection signal, on a display unit 203 with a substantially real time manner.

For example, the control unit 202 may receive detection signals (e.g., corresponding to light-intensity and beam-spot diameter detected by the light detectors 201Y, 201C, 201M, and 201K) from the light detectors 201Y, 201C, 201M, and 201K, and may display information, corresponding to detection signals, on the display unit 203 as lens-position-adjustment information with a substantially real time manner.

With such configuration, a maintenance person can conduct an adjustment work for adjusting a position of cylindrical lens 61 to an appropriate position while checking or looking up the lens-position-adjustment information displayed on the display unit 203.

Figure 7:
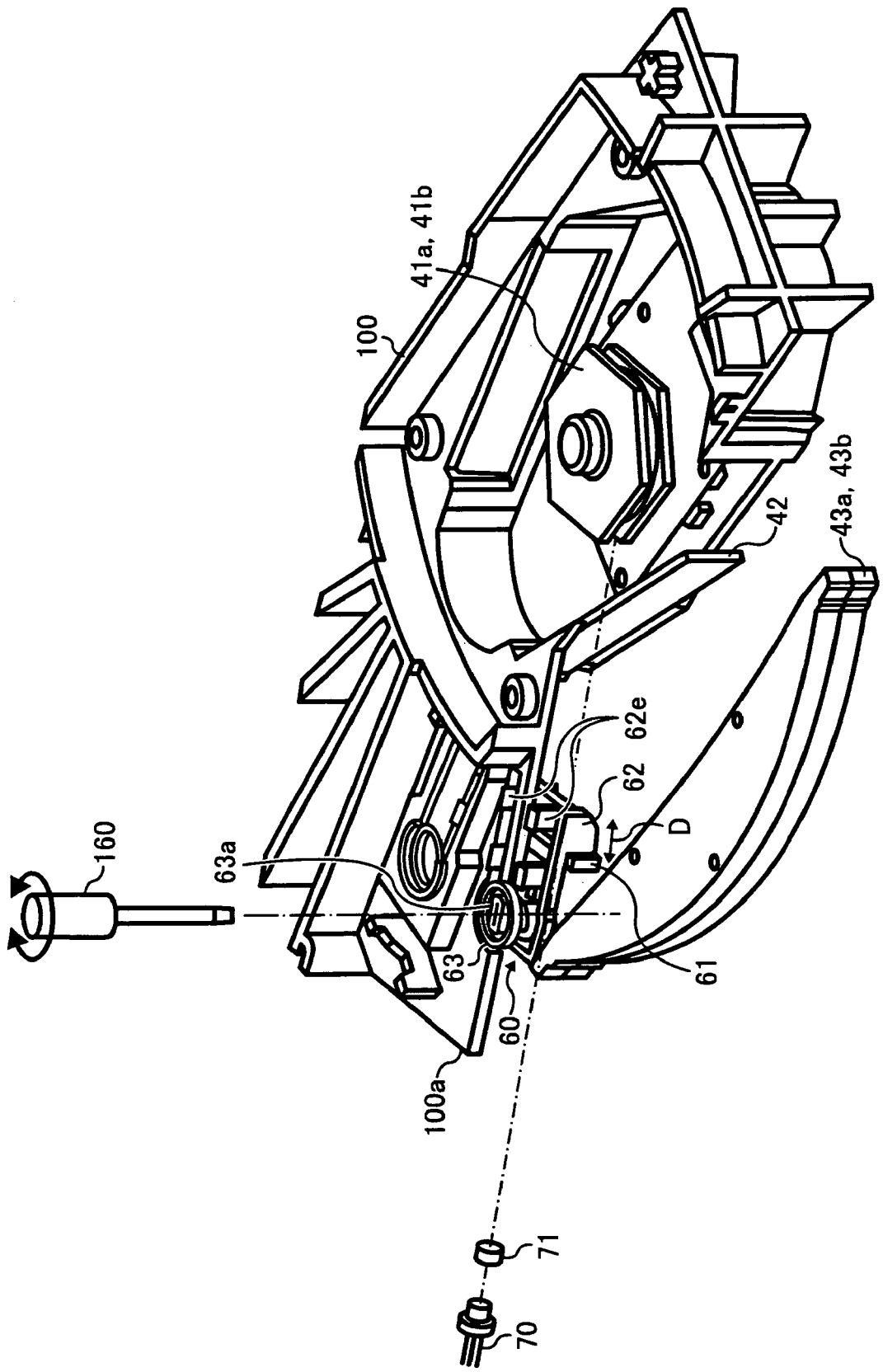
FIG. 7 is a schematic perspective view (according to an example embodiment of the present invention) of upper side of an optical scanning unit placed on a platform of an adjustment machine.

FIG. 7 is a schematic perspective view of upper side of the optical scanning unit 4 placed on the platform 200 of the adjustment machine, in which a plurality of parts, e.g., light source unit 70 and polygon mirrors 41a and 41b, related to a light path are shown.

Figure 8:
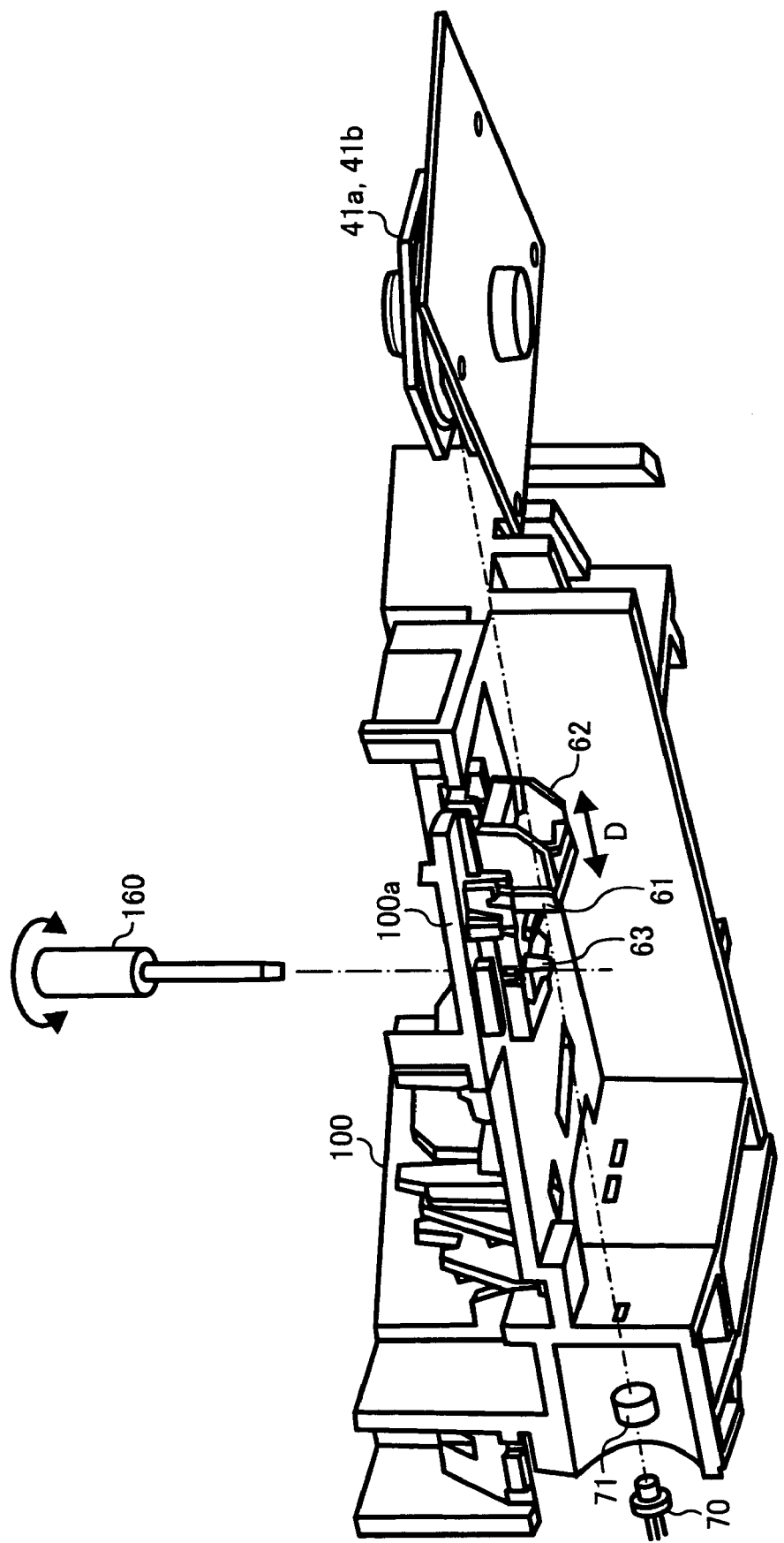
FIG. 8 is a schematic perspective view (according to an example embodiment of the present invention) of a lower side of an optical scanning unit placed on a platform of an adjustment machine.

FIG. 8 is a schematic perspective view of lower side of the optical scanning unit 4 placed on the platform 200 of the adjustment machine.

In FIGS. 7 and 8, some portions of the support plate 100a of the housing 100 may be omitted from the drawing for the purpose of simplicity of explanation.

Furthermore, because the lens units 60Y, 60C, 60M, and 60K may take a similar configuration one another, the lens unit 60 may be used hereinafter for the purpose of simplicity of explanation.

In an example embodiment, the optical writing unit 4 may be placed on the platform 200 of the adjustment machine with a posture or orientation, which is substantially similar to a posture or orientation when the optical writing unit 4 is installed in the image forming apparatus 1 (see FIGS. 1 and 3).

Accordingly, the light source unit 70, collimate lens 71, cylindrical lens 61 on the lens unit 60 may be positioned on a lower side of the support plate 100a of the housing 100 as shown in FIGS. 7 and 8.

As shown in FIGS. 7 and 8, the lens unit 60 may include a movable lens holder 62 for holding cylindrical lens 61, and a lens adjuster 63, for example.

The lens adjuster 63 may be used to adjust a movement of the lens holder 62 in a reference-axis direction D of the cylindrical lens 61, the reference-axis being defined between the light source unit 70 and the polygon mirrors 41a and 41b.

The lens adjuster 63 may include an adjusting member 63a, which is provided on an upper side of the support plate 100a, wherein a maintenance person may operate the adjusting member 63a with a driver (e.g., of a hand-held variety) 160.

As shown in FIGS. 7 and 8, the lens holder 62 may be disposed on the lower side of the support plate 100a, and the adjusting member 63a may be disposed so as to be accessible from the upper side of the support plate 100a, e.g., by being disposed on the upper side.

In an example embodiment, a maintenance person may rotate the adjusting member 63a with the driver 160 to move the lens holder 62; as a consequence, the cylindrical lens 61 is moved in a direction along the reference-axis, which is indicated by an arrow D in FIG. 8. Such configuration and movement will be explained later in detail. The combination including the lens holder 62 and the cylindrical lens 61 occupies/consumes a first volume in space. The combination also has a range of motion along the reference-axis. The range can be described in terms of a length measured along the reference-axis relative to a reference point thereon. At any position in the range, the combination will consume/occupy an amount of space equal to the first volume. To ensure unrestricted movement throughout the range of motion, a second volume of open space (i.e., a space that can be occupied) should be provided. Depending upon where the reference point is established, the second volume can be determined, e.g., as a product of the first volume multiplied by the length, or as a product of the first volume multiplied by an adjusted value of the length, etc. The second volume can be described as an occupiable space in the sense that the combination can be moved through the occupiable space and (at any given position along the range of motion) can consume/occupy a portion of the occupiable space, the portion being equal to the first volume.

In general, an adjustment work for adjusting a position of the cylindrical lens 61 in its reference-axis direction at an appropriate position may need to be conducted with a highly precise manner.

Therefore, it can be beneficial to make adjustment work, associated with positioning the cylindrical lens 61, easier and simplified.

In an example embodiment, the adjusting member 63a may be positioned so as to be accessible from the upper side of the support plate 100a (e.g., the adjusting member 63a may be disposed on the upper side of the support plate 100a) as shown in FIGS. 7 and 8.

Accordingly, a maintenance person can operate the adjusting member 63a with the driver 160 from an upper side of the support plate 100a.

Therefore, the maintenance person may operate the adjusting member 63a with an easier manner compared to a hypothetical configuration (not shown) that would dispose the adjusting member 63a at the lower side of the support plate 100a.

Furthermore, in a configuration according to an example, the cylindrical lens 61 may be positioned at the lower side face of the support plate 100a as shown in FIGS. 7 and 8 when the maintenance person may conduct an adjustment work.

Accordingly, an incident light, which may enter the cylindrical lens 61, and an outgoing light, which may outgo from the cylindrical lens 61, may pass or go through an underside of the support plate 100a.

Therefore, the maintenance person, while using the driver 160 for operating the adjusting member 63a, may avoid blocking a light-path for the incident light and outgoing light of the cylindrical lens 61 with the driver 160.

With such configuration, when the maintenance person conducts an adjustment work for positioning the cylindrical lens 61 in its reference-axis direction, the maintenance person may conduct following operations with an easier and effective manner as below.

Specifically, the maintenance person may rotate the adjusting member 63a with the driver 160 while checking or looking-up the lens-position-adjustment information displayed on the display unit 203 to find an appropriate positioning of the cylindrical lens 61 in its reference-axis direction.

Accordingly, a working efficiency of the adjustment work for the cylindrical lens 61 may be enhanced.

In an example embodiment, the optical writing unit 4 may be placed on the platform 200 of the adjustment machine as shown in FIG. 6 when it is desired to conduct an adjustment work of the cylindrical lens 61 in its reference-axis direction.

Under such configuration shown in FIG. 6, the polygon mirrors 41a and 41b may deflect a scanning light beam. Then, such scanning light beam may reflect at the first mirrors 44a, 44b, 44c, 44d, the second mirrors 46a, 46b, 46c, 46d, and the third mirrors 47a, 47b, 47c, 47d.

With such reflection at the mirrors, such scanning light beam may pass through the upper side of the support plate 100a (see FIG. 6) and then reaches the light detectors 201Y, 201C, 201M, and 201K.

Depending on a positional relationship of the adjusting member 63a and a light-path for the optical writing unit 4, such scanning light beam may happened to be partially blocked by the driver 160.

However, in an example embodiment, the light detector 201 may not detect the scanning light beam in an entire length of the axial direction of the photoconductor 10, but instead may detect the scanning light beam at three portions (e.g., both end portion and center portion of the photoconductor 10) as one example as above-mentioned.

Based on detection results from fewer than all, e.g., 2 out of 3, detectors of the light detector 201, lens-position-adjustment information may be displayed on the display unit 203, and a maintenance person may conduct an adjustment work while checking or looking-up the lens-position-adjustment information.

In such configuration, the driver 160 may block a part of the scanning light beam when conducting an adjustment work of the cylindrical lens 61 without completely interrupting the generation and display of lens-position-adjustment information. Such robust operation is possible because the scanning light beam may be detected at separate portions (e.g., three portions in example embodiment) in the axial direction of the photoconductor 10 as above-mentioned, wherein such portions may be spaced apart from each other.

However, such blocked portion by the driver 160 can be set to a portion, which can avoid the light-path of scanning light beam over the support plate 100a.

Accordingly, when a positional relationship of adjusting member 63a and light-path of scanning light beam may be set to a configuration that the light detector 120 can detect scanning light beam without a blocking effect of the driver 160 when conducting an adjustment work of the cylindrical lens 61, an maintenance person may conduct such adjustment work effectively and efficiently.

Although not shown, the driver 160 may be inserted to the adjusting member 63a of the lens adjuster 63 without opening the upper cover 120, for example. In such a case, the upper cover 120 may have an opening at a position over the adjusting member 63a. Such opening may be covered by a cover (not shown) during a normal image forming operation, and may be opened when conducting the above-described adjustment work.

Figure 9:
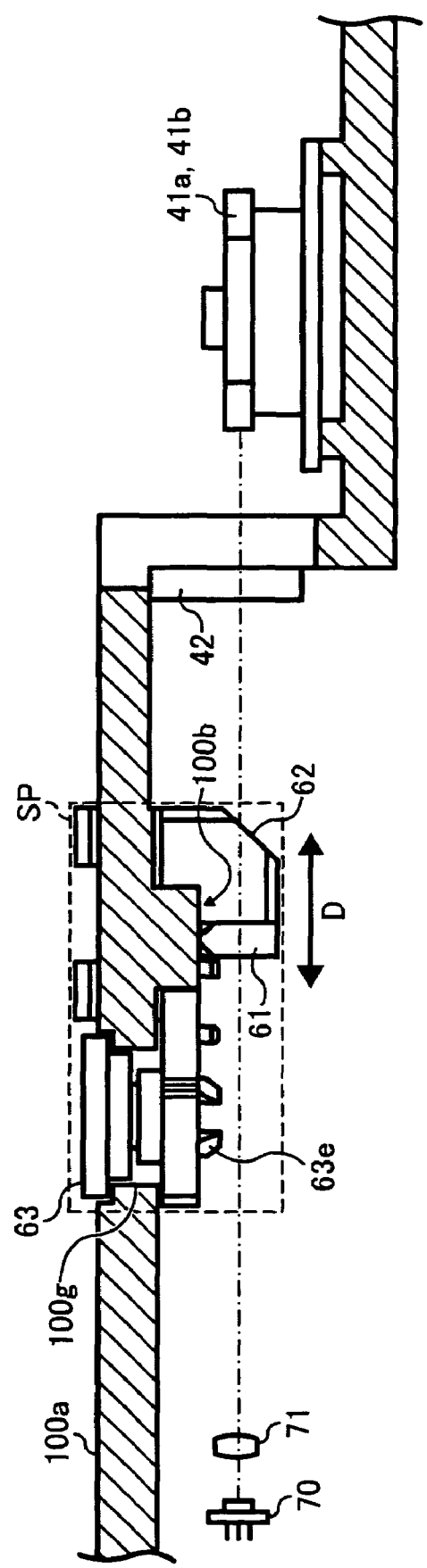
FIG. 9 is a schematic cross sectional view (according to an example embodiment of the present invention) of an optical scanning unit, in which a positioning of a lens unit is shown.

Hereinafter, the lens unit 60 is explained in detail with reference to FIG. 9. FIG. 9 is a schematic cross sectional view of the optical scanning unit 4, in which a positioning of the lens unit 60 is shown.

In an example embodiment, the lens holder 62 may hold the cylindrical lens 61 while constantly contacting a face of the cylindrical lens 61 to a lens-receiving face 100b.

As shown in FIG. 9, the lens-receiving face 100b may be provided at a lower side of the support plate 100a of the housing 100.

In an example embodiment, the lower side of the support plate 100a may include two lens-receiving faces 100b, formed in a parallel direction of the reference-axis direction of the cylindrical lens 61, for example.

Accordingly, the two lens-receiving faces 100b may contact with a plurality of contact faces of the cylindrical lens 61. Such plurality of contact faces of the cylindrical lens 61 may be referred as contact face of the cylindrical lens 61, hereinafter, as required.

In example embodiment, the lens holder 62, holding the cylindrical lens 61, may be attached to the support plate 100a while the lens holder 62 may be movable in a reference-axis direction of the cylindrical lens 61.

The lens holder 62 may be moved in a reference-axis direction of the cylindrical lens 61 shown by an arrow D in FIG. 9 by rotating the adjusting member 63a (not shown in FIG. 9, but see FIG. 7). Such direction shown by an arrow D may be referred as reference-axis direction D, hereinafter, as required.

During a movement of the lens holder 62 in the reference-axis direction D, the contact face of the cylindrical lens 61 may maintain a contact condition with the lens-receiving face 100b.

In other words, when the lens holder 62 is moved in the reference-axis direction D, the cylindrical lens 61 may remain in contact while slidably moving on the lens-receiving face 100b.

In an example embodiment, a higher precision lens-receiving face 100b may be made with a fine surface finishing.

If the lens-receiving face 100b is formed with a higher precision, the cylindrical lens 61 may be regulated and positioned relative to the lens-receiving face 100b in a more precise manner when the lens holder 62 is moved.

Such configuration may enhance a precision of light reference-axis alignment of light source units 70, cylindrical lens 61, and polygon mirrors 41a and 41b.

In such configuration, a lens focal line of cylindrical lens 61 and a scanning face of polygon mirrors 41a and 41b may be precisely aligned with each other over time.

If the lens focal line of cylindrical lens 61 and scanning face of polygon mirrors 41a and 41b may not be aligned in a precise manner with each other, an optical property of the light beam may degrade (e.g., unfavorably larger beam-spot diameter).

In an example embodiment, the lens focal line of cylindrical lens 61 and scanning face of polygon mirrors 41a and 41b may be better aligned by more precisely positioning the cylindrical lens 61.

In an example embodiment, the cylindrical lens 61 may be more precisely positioned when the cylindrical lens 61 is moved in its reference-axis direction D to better maintain alignment of the lens focal line of cylindrical lens 61 and scanning face of polygon mirrors 41a and 41b.

Although not shown, in a hypothetical case, an intervening part may be disposed between the cylindrical lens 61 and the lens-receiving face 10b, wherein the lens-receiving face 100b may be used for determining the positioning of the cylindrical lens 61.

If a number of such intervening parts may become greater, dimensional error of each intervening part may be accumulated, and an assembly error of intervening parts may also be accumulated. If such error becomes greater, the cylindrical lens 61 may not be correctly positioned.

In an example embodiment, the cylindrical lens 61 may contact the lens-receiving face 100b (used as reference face for positioning) directly.

In other words, the cylindrical lens 61 and lens-receiving face 100b may contact each other without interposing an intervening part therebetween.

Therefore, in an example embodiment, the cylindrical lens 61 may be positioned with a higher precision manner compared to a configuration (not shown) having an intervening part between the cylindrical lens 61 and lens-receiving face 100b.

Figure 10:
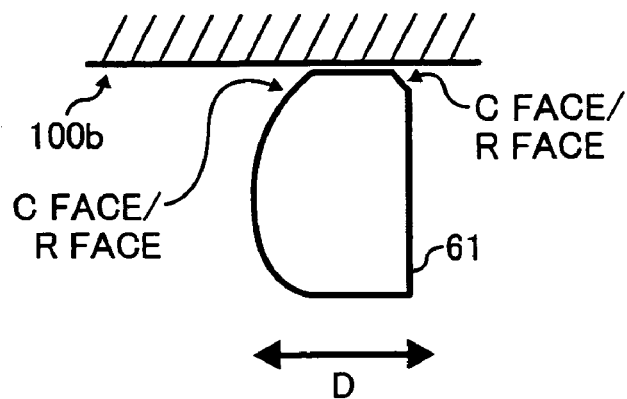
FIG. 10 is an expanded view (according to an example embodiment of the present invention) of a cylindrical lens and a lens-receiving face, which contact each other.

FIG. 10 is an expanded view of the cylindrical lens 61 and the lens-receiving face 100b, which may contact each other.

In an example embodiment, the cylindrical lens 61 may slidably move on the lens-receiving face 100b in the reference-axis direction D shown in FIG. 10 by rotating the adjusting member 63a with the driver 160 (see FIG. 7).

In an example embodiment, the housing 100 and lens-receiving face 100b may be made of resinous material in view of reducing manufacturing cost.

If the cylindrical lens 61 may have a contact face having a sharp edge portion, such cylindrical lens 61 may scrape the lens-receiving face 100b for some amount when the cylindrical lens 61 slidably moves on the lens-receiving face 100b in the reference-axis direction D in FIG. 10.

If the cylindrical lens 61 may slidably move on the lens-receiving face 100b repeatedly, the lens-receiving face 100b may be scraped more and more, and resultantly, such scraped lens-receiving face 100b may cause a precision degradation of positioning of the cylindrical lens 61.

In view of such drawback, in an example embodiment, an edge portion of contact face of the cylindrical lens 61 may receive a chamfering or rounding process so that the contact face of the cylindrical lens 61 may have a C-face or R-face at the edge portion, wherein the C-face may mean a chamfered face and R-face may mean a rounded face as shown in FIG. 10.

With such chamfering or rounding process to the contact face of the cylindrical lens 61, a scraping effect of the cylindrical lens 61 to the lens-receiving face 100b may be reduced compared to a cylindrical lens having no chamfering or rounding process to its contact face.

Accordingly, even if the cylindrical lens 61 may slidably move on the lens-receiving face 100b in the reference-axis direction shown by an arrow D in FIG. 10 repeatedly, the cylindrical lens 61 may be positioned with a higher precision over time. In other words, a positioning precision of the cylindrical lens 61 may not degrade over time.

Figure 11A:
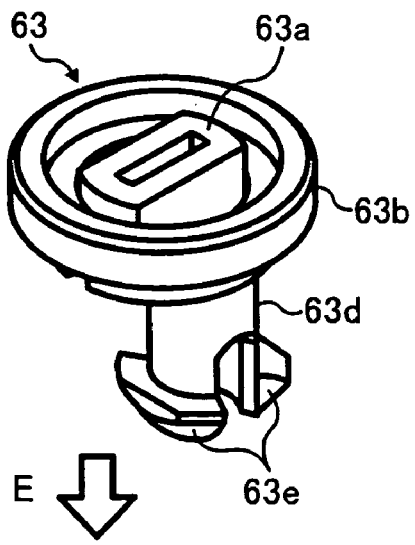
FIG. 11A is an upper perspective view (according to an example embodiment of the present invention) of an adjusting member.

FIG. 11A is an upper perspective view of the adjusting member 63a of lens adjuster 63, viewed from an upper side of the support plate 110a. In other words, a maintenance person may see the adjusting member 63a of lens adjuster 63 in an angle shown in FIG. 11A.

Figure 11B:
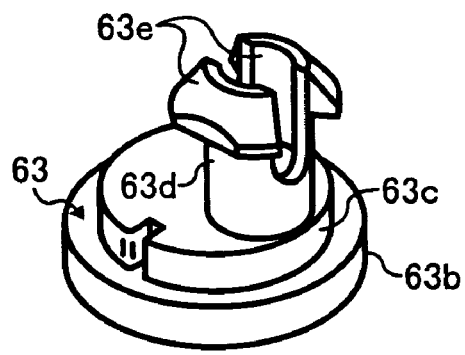
FIG. 11B is a lower perspective view (according to an example embodiment of the present invention) of an adjusting member.

FIG. 11B is a lower perspective view of the adjusting member 63a of lens adjuster 63, viewed from a lower side of the support plate 110a.

Figure 12A:
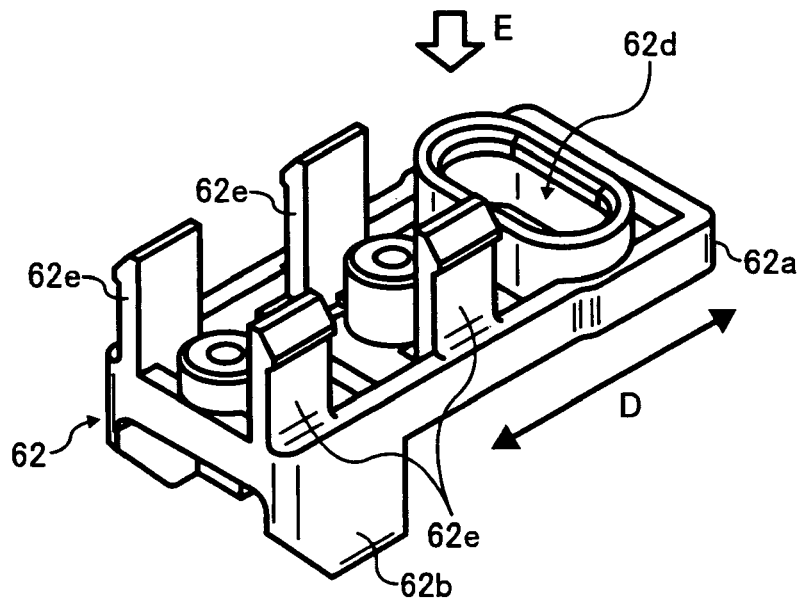
FIG. 12A is an upper perspective view (according to an example embodiment of the present invention) of a lens holder.
Figure 12B:
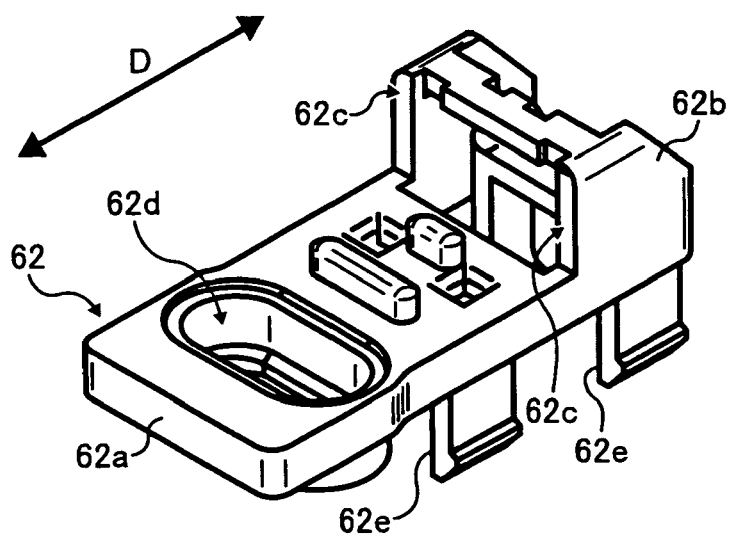
FIG. 12B is a lower perspective view (according to an example embodiment of the present invention) of a lens holder.

FIG. 12A is an upper perspective view of the lens holder 62, viewed from an upper side of the support plate 110a. FIG. 12B is a lower perspective view of the lens holder 62, viewed from a lower side of the support plate 110a.

As shown in FIGS. 11A and 11B, the lens adjuster 63 may include the adjusting member 63a, a base 63b, a center-axis shaft 63c, an eccentric shaft 63d, for example.

The base 63b may be rotatable by a force applied to the adjusting member 63a.

The center-axis shaft 63c may extend from the base 63b in a direction along the rotational center axis of the base 63b.

The eccentric shaft 63d may extend from the base 63b in a direction, deviated and parallel to the rotational center axis of the base 63b (see FIG. 11B).

As shown in FIG. 11A, the base 63b may include the adjusting member 63a, which receive the driver 160, at the upper side of the base 63b.

When the driver 160 rotates the adjusting member 63a, the center-axis shaft 63c may rotate around a rotational center axis of the base 63b.

Then, the eccentric shaft 63d may rotate eccentrically around the rotational center axis of the base 63b.

In an example embodiment, the lens adjuster 63 may be made of resinous material such as polyacetal resin, but not limited to polyacetal resin.

If the lens adjuster 63 is made of resinous material such as polyacetal resin, the lens adjuster 63 may receive a relatively smaller abrasion effect by friction when an adjustment work of the cylindrical lens 61 is conducted.

As described later, the lens adjuster 63 may contact the lens holder 62 and support plate 100a, by which the lens adjuster 63 may friction with the lens holder 62 and support member 100.

With such configuration using resinous material, an adjustment work of the cylindrical lens 61 may be conducted with a higher precision manner over time.

As shown in FIGS. 12A and 12B, the lens holder 62 may include a holder base 62a, and a lens receiver 62b, for example.

The holder base 62a may be attached to the lower side of the support plate 100a.

The lens receiver 62b may be protruded from a face of the holder base 62a as shown in FIG. 12B.

The cylindrical lens 61 may be pressed to a contacting face 62c of the lens receiver 62b, and then be held to the lens holder 62 with a fixing member (to be explained later).

In an example embodiment, a light-outgoing face of the cylindrical lens 61 may be pressed to the contacting face 62c.

As shown in FIGS. 12A and 12B, the holder base 62a may include an adjustment hole 62d.

The adjustment hole 62d may have a substantially oblong or rectangular shape, a long axis of which is extended in a direction perpendicular to the above-mentioned reference-axis direction D. As above explained, the lens holder 62 may be moved in the reference-axis direction D.

The eccentric shaft 63d may be inserted into the adjustment hole 62d.

A width of the adjustment hole 62d may mean a width in the reference-axis direction D of the holder base 62a. Such width of the adjustment hole 62d may set to a value substantially corresponding to a dimension of the eccentric shaft 63d, or set to a value which is slightly larger than a diameter of the eccentric shaft 63d.

Furthermore, the holder base 62a may be provided with a guide 62e protruded from the holder base 62a as shown in FIGS. 12A and 12B.

In an example embodiment, the lens unit 60 may be assembled and attached to the support plate 100a as below.

At first, the cylindrical lens 61 may be held onto the lens holder 62.

Then, the guide 62e may be engaged to a guide hole (not shown) provided to the support plate 100a with a snap-fit manner.

Such guide hole, formed in the support plate 100a may have a substantially oblong figure, which is extended in the reference-axis direction D of the cylindrical lens 61. A width of the guide hole may be set to a value corresponding to a thickness of the guide 62e.

Figure 13:
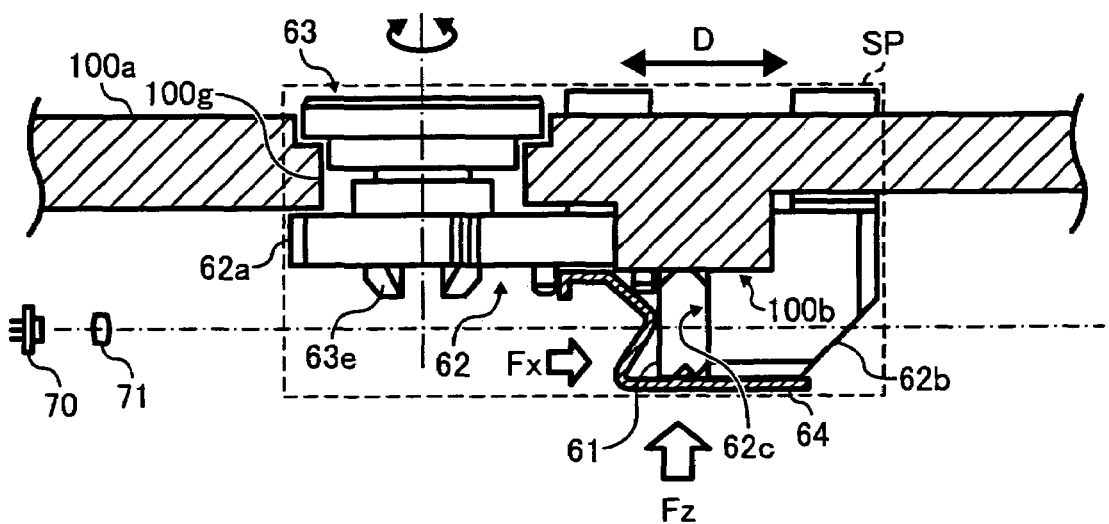
FIG. 13 is a schematic view (according to an example embodiment of the present invention) for explaining a holding mechanism of a cylindrical lens in a lens holder.

With such configuration, the lens holder 62 may be attached to the lower side face of the support plate 100a as shown in FIGS. 9 and 13, and may be movable in the reference-axis direction D of the cylindrical lens 61.

Then, the lens adjuster 63 having the adjusting member 63a may be fitted in a bearing hole 100g (see FIG. 9) in the support plate 100a.

Specifically, the center-axis shaft 63c of the lens adjuster 63 may be inserted into the bearing hole 100g from an upper side of the support plate 100a from a direction shown by an arrow E in FIG. 11A.

At this time, the eccentric shaft 63d of the lens adjuster 63 may be inserted into the adjustment hole 62d of the lens holder 62 from a direction shown by an arrow E in FIG. 12A, by which the eccentric shaft 63d may be inserted and snap-fitted into the adjustment hole 62d.

With such process, the lens unit 60 may be assembled and attached to the support plate 100a.

When the adjusting member 63a is rotated under such configuration, the lens adjuster 63 may rotate while the center-axis shaft 63c is supported by the bearing hole 100g of the support plate 100a.

Then, with a rotation of the lens adjuster 63, the eccentric shaft 63d may rotate eccentrically around the rotational center axis of the base 63b.

Then, with a rotation of the eccentric shaft 63d, the eccentric shaft 63d may contactingly push an inner wall of the adjustment hole 62d of lens holder 62.

Then, with such pushing movement in the adjustment hole 62d by the eccentric shaft 63d, the guide 62e of lens holder 62 may be moved in the guide hole, formed in the support plate 100a.

With such process, the lens holder 62 may move reciprocally along the reference-axis direction D of the cylindrical lens 61 under the lower side of the support plate 100a.

In an example embodiment, the lens holder 62 and lens adjuster 63 may be assembled to the support plate 100a with a snap-fit process. The snap-fit process may reduce a time required for assembling or removing parts compared to a screw-fitting process or the like.

With such assembly process requiring less time for assembly, the lens unit 60 may be assembled to the support plate 100a with an enhanced working efficiency.

Furthermore, even if the cylindrical lens 61 may be contaminated or scratched, the cylindrical lens 61 may be replaced more easily in the above-described assembly configuration.

In an example embodiment, the adjusting member 63a may have a shape that can be operated by the driver 160. However, the adjusting member 63a can take another shape such as hexagonal shape that can be operated by a wrench, for example.

Furthermore, in an example embodiment, the lens holder 62 may have a coefficient of linear expansion of about $1.0 \times 10^{-5}$ (1/° C.) or less, for example.

Because the cylindrical lens 61 may be disposed closely to the polygon mirrors 41a and 41b, the lens holder 62 also be disposed closely to the polygon mirrors 41a and 41b as shown in FIG. 9.

Because the polygon motor for driving the polygon mirrors 41a and 41b may generate a relatively greater amount of heat, the lens holder 62, disposed closely to the polygon mirrors 41a and 41b, may be susceptible to such generated heat.

If the heat generated at the polygon mirrors 41a and 41b may affect the lens holder 62, a position of the cylindrical lens 61 may be deviated from an appropriate position. For example, such heat effect may deform the contacting face 62c of the lens holder 62.

In view of such heat effect, in an example embodiment, the lens holder 62 may have the coefficient of linear expansion of about $1.0 \times 10^{-5}$ (1/° C.) or less so that heat generated at the polygon mirrors 41a and 41b may not affect a positioning of the cylindrical lens 61.

In other words, such heat effect may be controlled within a practical rage for realizing an appropriate positioning of the cylindrical lens 61.

The lens holder 62 having the coefficient of linear expansion of about $1.0 \times 10^{-5}$ (1/° C.) or less may be manufactured from a resinous material such as polycarbonate (PC), for example. Such resinous material may be preferable from a viewpoint of reducing manufacturing cost and enhancing mass produce-ability.

Hereinafter, a retaining mechanism for retaining the cylindrical lens 61 in the lens holder 62 is explained.

Figure 14A:
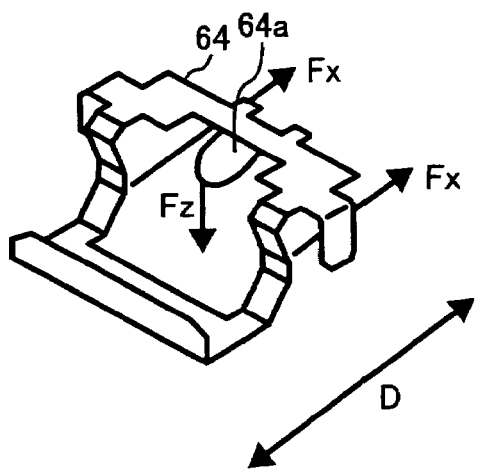
FIGS. 14A and 14B are example perspective views (according to respective example embodiments of the present invention) of a fastening member configuring a retaining mechanism.
Figure 14B:
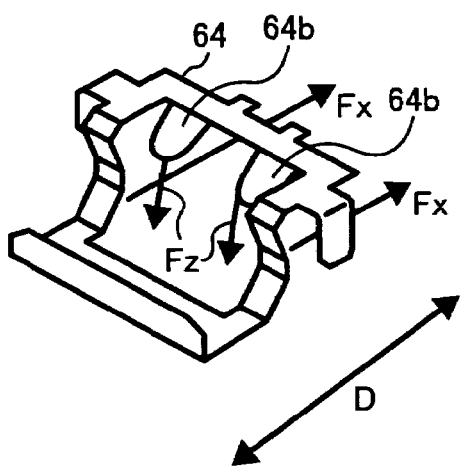

FIG. 13 is a schematic view for explaining a retaining mechanism for retaining the cylindrical lens 61 in the lens holder 62. FIGS. 14A and 14B are example perspective views of a fixing member 64, which may configure the retaining mechanism.

In an example embodiment, as shown in FIG. 13, the light-outgoing face of the cylindrical lens 61 may contact the contacting face 62c of the lens holder 62.

Then, as shown in FIG. 13, the light-incoming face of the cylindrical lens 61 may be biased with the fixing member 64 such as leaf spring with a first biasing (e.g., resiliently biasing) force Fx.

With such first biasing force Fx, a position of the cylindrical lens 61 in its reference-axis direction D may be determined while pressing the light-outgoing face of the cylindrical lens 61 to the contacting face 62c.

Furthermore, the cylindrical lens 61 may be biased toward the lower side of the support plate 100a with the fixing member 64 with a second biasing (e.g., resiliently biasing) force Fz.

With such second biasing force Fz, a position of the cylindrical lens 61 in a normal line direction of the support plate 100a may be determined.

If an external shock (e.g., an impulse force) may occur to the optical writing unit 4 or image forming apparatus 1, contact between the cylindrical lens 61 and the lens-receiving face 100b may temporarily become broken/interrupted, and then the positioning of the cylindrical lens 61 in the normal line direction of the support plate 100a may be deviated from an appropriate position.

Such external shock may occur to the optical writing unit 4 or image forming apparatus 1 if a person may drop the optical writing unit 4 or image forming apparatus 1 carelessly, for example.

In an example embodiment, the cylindrical lens 61 may more likely to be effected by a gravity effect due to a configuration of an example embodiment, and such gravity effect may cause the cylindrical lens 61 to leave from the lens-receiving face 100b more or less.

Under such configuration, the positioning of the cylindrical lens 61 in the normal line direction of the support plate 100a may be deviated from an appropriate position.

In view of such situation, in an example embodiment, the fixing member 64 may be configured to set the second biasing force Fz effectively greater than the first biasing force Fx.

The second biasing force Fz may press the cylindrical lens 61 toward the lens-receiving face 100b.

The first biasing force Fx may press the cylindrical lens 61 toward the contacting face 62c of the lens receiver 62b.

Specifically, following two forces may be assumed to realize an appropriate positioning of the cylindrical lens 61.

A first force may be defined as a total static friction of the lens receiver 62b, fixing member 64, and cylindrical lens 61. The first force may be generated in a reference-axis direction of the cylindrical lens 61.

First force=(total static friction of members)

A second force may be defined with the second biasing force Fz of the fixing member 64 and a self-weight of the cylindrical lens 61.

Specifically, the second force may be defined by subtracting a self-weight of the cylindrical lens 61 from the second biasing force Fz.

Second force=(Fz)−(self-weight of cylindrical lens 61)

Therefore, the above-explained two forces may have a following relationship for realizing an appropriate positioning of the cylindrical lens 61.

Second force>First force

With such relationship, even if contact between the cylindrical lens 61 and the lens-receiving face 100*b* may become disrupted, the second biasing force Fz of the fixing member 64 may push back the cylindrical lens 61 toward the lens-receiving face 100*b* so as to restore the contact.

With such configuration, even if an external shock temporarily disrupts contact between the cylindrical lens 61 and the lens-receiving face 100*b* of the optical writing unit 4, the cylindrical lens 61 may be returned to a contact condition with the lens-receiving face 100*b*.

Accordingly, a position of the cylindrical lens 61 in the normal line direction of the support plate 100*a* may be maintained at an appropriate position.

As shown in FIG. 14A, the fixing member 64 may have a configuration having a pressing member 64*a* to press a center portion of bottom side of the cylindrical lens 61 toward the lens-receiving face 100*b*, for example.

Furthermore, as shown in FIG. 14B, the fixing member 64 may have another configuration having two pressing members 64*b* to press each end portion of bottom side of the cylindrical lens 61 toward the lens-receiving face 10*b*, for example.

In general, the more the number of pressing members, the better the positioning of the cylindrical lens 61 in the normal line direction of the support plate 100*a*. The number of pressing members may be determined by considering several factors.

In an example embodiment, the lens holder 62 and fixing member 64 may be manufactured as separate parts. However, the lens holder 62 alone may include a function similar to the fixing member 64, as required.

Furthermore, in an example embodiment, a configuration for moving the lens holder 62 has a following feature as shown in FIG. 9.

In recent years, an image forming apparatus may be manufactured with a concept of further miniaturization. Accordingly, each part may be preferably manufactured smaller and smaller.

In case of configuration for moving the lens holder 62, the lens holder 62 may need or occupy a relatively larger space. Therefore, a miniaturization of the lens holder 62 may be considered when designing a miniaturization of an optical unit and image forming apparatus. In addition, a miniaturization of the lens adjuster 63 may also be considered.

In an example, as shown in FIGS. 9 and 13, an occupiable space SP of the lens holder 62 in the reference-axis direction D may be considered because such occupiable space SP may occupy a relatively larger space under the lower side of the support plate 100*a*.

The occupiable space SP, shown by a dot line in FIGS. 9 and 13, may have a given volume, which may be determined by several designing factors. Although not shown in FIGS. 9 and 13, the occupiable space SP may have an imagined three-dimensional shape when viewing the lens holder 62 in the reference-axis direction D. For example, such imagined three-dimensional shape may be an imagined rectangular parallelepiped shape, for example.

In view of miniaturization of an optical unit and image forming apparatus, a size of the lens holder 62 may be reduced, by which the occupiable space SP of the lens holder 62 may be reduced.

Under such condition, a design work may be conducted to limit a space required for lens adjuster 63 to be within such occupiable space SP of the lens holder 62.

For example, as shown in FIG. 11B, the lens adjuster 63 has a snap-edge 63*e* at the end of the eccentric shaft 63*d*.

If such snap-edge 63*e* may not be within the occupiable space SP of the lens holder 62 (i.e., the snap-edge 63*e* may be out of the occupiable space SP), a miniaturization of the configuration for moving the lens holder 62 may not be realized.

In an example embodiment, a size of the snap-edge 63*e* may be set within the occupiable space SP of the lens holder 62 under the lower side of the support plate 100*a* as shown in FIGS. 9 and 13.

With such designing, a configuration for moving the lens holder 62 under the lower side of the support plate 100*a* may be preferably miniaturized, by which a space-saving of an image forming apparatus may be enhanced.

Figure 15:
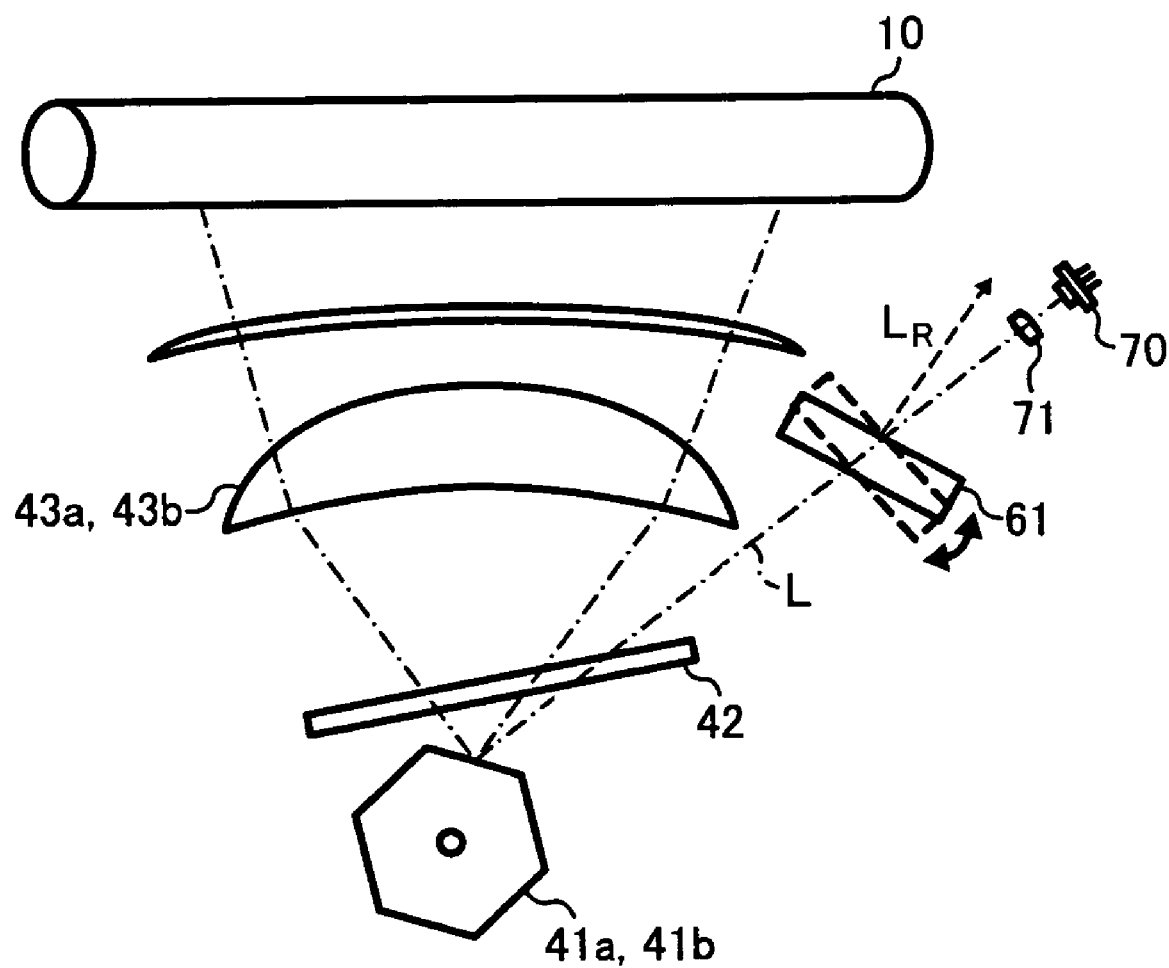
FIG. 15 is a schematic view (according to an example embodiment of the present invention) explaining an arrangement of a cylindrical lens and a light source.

Furthermore, in an example embodiment, the cylindrical lens 61 may be tilted for a given degrees as shown in FIG. 15 to adjust a normal line direction of a light-incoming face of the cylindrical lens 61 with respect to a direction of light beam coming form the light source unit 70Y, 70M, 70C, and 70K.

In an example embodiment, a controller (not shown) may detect electric current, which runs in a laser diode in the light source unit 70Y, 70M, 70C, and 70K.

Then, the controller may control the laser diode with a feedback control method based on detection results of electric current of the laser diode so that the laser diode may emit a light beam having a stabilized light intensity over time.

If a light-beam emitting direction of the light source unit 70Y, 70M, 70C, and 70K and the normal line direction of the light-incoming face of the cylindrical lens 61 may be aligned in a substantially similar direction, a reflecting light LR reflecting on the light-incoming face of the cylindrical lens 61 may enter the light source unit 70Y, 70M, 70C, and 70K.

If such condition may occur, the controller may not be able to control the light source unit 70Y, 70M, 70C, and 70K with a feedback control method, by which a light-output of the light source unit 70Y, 70M, 70C, and 70K may be destabilized.

In view of such condition, in an example embodiment, the cylindrical lens 61 may be tilted for a given degrees as shown in FIG. 15 to adjust the normal line direction of the light-incoming face the cylindrical lens 61 with respect to a direction of light beam coming form the light source unit 70Y, 70M, 70C, and 70K.

Specifically, the normal line direction of the light-incoming face the cylindrical lens 61 may be slanted with respect to the direction of light beam coming form the light source unit 70Y, 70M, 70C, and 70K.

With such configuration, the reflecting light LR reflecting on the light-incoming face of the cylindrical lens 61 may not enter the light source unit 70Y, 70M, 70C, and 70K, by which the controller may control the light source unit 70K, 70M, 70C, 70Y with a feedback control method so that the light source unit 70K, 70M, 70C, 70Y may emit a light beam having a stabilized light intensity over time.

Furthermore, in an example embodiment, the heat insulating glass 42 may be provided between the cylindrical lens 61 and polygon mirrors 41*a* and 41*b*. Accordingly, heat generated at the polygon mirrors 41*a* and 41*b* may not be transmitted to the cylindrical lens 61, and thereby a positioning of the cylindrical lens 61 may be effectively conducted by reducing heat effect from the polygon mirrors 41*a* and 41*b*.

Numerous additional modifications and variations are possible in light of the above teachings. It is therefore to be understood that within the scope of the appended claims, the disclosure of the present invention may be practiced otherwise than as specifically described herein.

What is claimed is:

1. An optical scanning unit, comprising:
   a light source configured to emit a light beam;
   a lens arranged so that the light beam emitted from the light source passes therethrough;
   a rotatable deflector configured to deflect the light beam coming from the lens, the deflected light beam being guided to a light receiving member;
   a movable lens holder configured to hold the lens, the lens holder being provided in a space between the light source and the deflector;
   a support member having a first face located on a first side thereof, the first face facing toward a vertically-downward direction and extending in a direction substantially parallel to a light axis direction defined between the light source and the deflector, there also being a second face located on a second side, the second face being arranged opposite to the first face;
   an adjusting member provided on the second face and being operable from a vertically-upward direction by receiving a force; and
   a moving mechanism configured to move the lens holder in the light axis direction, while the lens holder being supported on the first face, using the force received by the adjusting member, the moving mechanism being on the opposite side of the adjusting member with respect to the supporting member.

2. The optical scanning unit according to claim 1, wherein the lens holder is movable in a direction toward the light source and the deflector.

3. The optical scanning unit according to claim 2, wherein the lens includes a cylindrical lens configured to adjust an optical property of the light beam, the optical property of the light beam including a beam spot property.

4. The optical scanning unit according to claim 1, wherein the lens holder has a range of motion that defines an occupiable space along the first face of the support member, and the adjusting member is sized to fit within the occupiable space of the lens holder.

5. The optical scanning unit according to claim 1, wherein:
   the adjusting member includes the following,
      a base member configured to be rotatable by the adjusting member, the base member being exposed to the second side of the support member,
      a center-axis shaft extending from the base member along a rotational center axis of the base member, and
      an eccentric-axis shaft extending from the base member while deviating and parallel to the rotational center axis of the base member;
   the lens holder includes an adjustment hole having a substantially oblong or rectangular shape, in terms of length the shape having a larger axis perpendicular to the light axis direction, in terms of width the shape having a smaller axis perpendicular to the larger axis, the width of the shape corresponding to a dimension of the eccentric-axis shaft, the eccentric-axis shaft being insertable into the adjustment hole; and
   the support member includes a bearing hole, to which the center-axis shaft is inserted and supported.

6. The optical scanning unit according to claim 5, wherein the adjusting member is made of a resinous material.

7. The optical scanning unit according to claim 6, wherein the resinous material includes polyacetal resin.

8. The optical scanning unit according to claim 1, wherein the adjusting member slidably moves the lens holder along the first face of the support member while maintaining contact condition between a surface of the lens and the first face of the support member, the surface of the lens having one of a chamfered and rounded corner.

9. The optical scanning unit according to claim 1, wherein the lens holder is provided with a fixing member to retain contact between the lens and the first face of the support member, the fixing member including a first biasing portion and a second biasing portion, the first biasing portion biasing the lens in a first direction, which is substantially parallel to the light axis direction, and the second biasing portion biasing the lens in a second direction, which is toward the support member and perpendicular to the first biasing direction, and a force applied from the second direction is set greater than a static friction in the first direction generated by the first biasing portion, the lens holder, and the lens.

10. The optical scanning unit according to claim 1, wherein the lens is tiltable to slant a normal line direction of a light-incoming face of the lens with respect to the light axis direction.

11. The optical scanning unit according to claim 1, wherein the lens holder has a coefficient of linear expansion of about $1.0 \times 10^{-5}$ ($1/°$ C.) or less.

12. The optical scanning unit according to claim 1, further comprising a transparent member provided between the lens holder and the deflector.

13. The optical scanning unit according to claim 12, wherein the transparent member is made of a heat insulating material.

14. An image forming apparatus comprising:
   an image-carrying member;
   the optical scanning unit of claim 1, configured to form a latent image on the image-carrying member via irradiating a light beam on the image-carrying member; and
   a developing unit configured to develop the latent image and to transfer the developed image to a recording medium.

15. The optical scanning unit according to claim 1, wherein:
   the force applied to the adjusting member is rotational; and
   the adjusting member and the support member cooperate to convert the rotational force into a linear force.

16. A maintenance system comprising:
   the optical scanning unit of claim 1;
   a plurality of light detectors disposed on the first side of the support member at positions corresponding to where photoconductors otherwise would be disposed if the optical scanning unit was installed in an image forming apparatus; and
   a control unit to receive detection signals from the plurality of tight detectors and to determine lens-position-adjustment information.

17. An optical scanning unit, comprising:
   a light source configured to emit a light beam;
   a lens arranged so that the light beam emitted from the light source passes therethrough;
   deflecting means for deflecting the light beam coming from the lens, the deflected light beam being guided to a light receiving member;

holding means for holding the lens, the holding means being movable and being provided in a space between the light source and the deflecting means;

supporting means for supporting the holding means, the supporting means having a first face located on a first side thereof, the first face facing toward a vertically-downward direction and extending in a direction substantially parallel to a light axis direction defined between the light source and the deflecting means, there also being a second face located on a second side, the second face being arranged opposite to the first face;

adjusting means provided on the second face and being operable from a vertically-upward direction by receiving a force; and moving means configured to move the lens holder in the light axis direction, while the lens holder being supported on the first face, using the force received by the adjusting means, the moving means being on the opposite side of the adjusting means with respect to the supporting means.

* * * * *